(12) United States Patent
Cattaneo

(10) Patent No.: US 12,553,460 B2
(45) Date of Patent: *Feb. 17, 2026

(54) SUPPORT DEVICE FOR FURNITURE SHELVES

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 913 days.

This patent is subject to a terminal disclaimer.

(21) Appl. No.: 17/623,740

(22) PCT Filed: Jul. 29, 2020

(86) PCT No.: PCT/IB2020/057142
§ 371 (c)(1),
(2) Date: Dec. 29, 2021

(87) PCT Pub. No.: WO2021/019455
PCT Pub. Date: Feb. 4, 2021

(65) Prior Publication Data
US 2022/0243752 A1   Aug. 4, 2022

(30) Foreign Application Priority Data

Jul. 31, 2019 (IT) .......................... 102019000013428
Sep. 13, 2019 (IT) .......................... 102020000016247

(51) Int. Cl.
*F16B 12/24* (2006.01)
*A47B 57/48* (2006.01)
*A47B 96/06* (2006.01)

(52) U.S. Cl.
CPC ............ *F16B 12/24* (2013.01); *A47B 57/485* (2013.01); *A47B 96/06* (2013.01)

(58) Field of Classification Search
CPC .. F16B 12/14; F16B 12/2009; F16B 12/2036; F16B 12/2063; F16B 2012/106;
(Continued)

(56) References Cited

U.S. PATENT DOCUMENTS 5,743,670 A       4/1998   Ader
9,222,496 B2 *  12/2015   Bernardin ................. F16B 7/18
(Continued)

FOREIGN PATENT DOCUMENTS

DE    3138530         6/1982
EP    0930436 A1     7/1999
(Continued)

*Primary Examiner* — Matthew R Mcmahon
(74) *Attorney, Agent, or Firm* — Themis Law

(57) ABSTRACT

A supporting device for furniture shelves configured to provide a reversible connection of a shelf with an opposite shoulder of a piece of furniture includes a main body, with which a movable engagement system is slidingly associated, coupled to a pin. The movable engagement system slides with respect to the main body along a sliding direction between a first non-operating position, in which the pin does not protrude from the shelf, and a second operating position, in which the pin projects outwardly from a transverse edge of the shelf. The supporting device further includes an actuation system of the engagement system and a movement-transmission system configured to transform the movement of the actuation system into a translational movement along the sliding direction of the movable engagement system.

14 Claims, 20 Drawing Sheets

(58) Field of Classification Search
CPC ........ F16B 2012/145; F16B 2012/2018; F16B 5/0024; F16B 2005/0678; F16B 35/005; F16B 12/10; F16B 12/24; A47B 95/008; A47B 96/06; A47B 96/066; A47B 57/485
See application file for complete search history.

(56) References Cited

U.S. PATENT DOCUMENTS

| | | | |
|---|---|---|---|
| 10,034,542 B2 * | 7/2018 | Giovannetti | ....... A47B 47/0091 |
| 10,605,286 B2 * | 3/2020 | Giovannetti | .......... F16B 13/068 |
| 11,098,740 B2 * | 8/2021 | Giovannetti | ............. A47C 4/02 |
| 11,877,657 B2 * | 1/2024 | Cattaneo | ............. A47B 96/066 |
| 2023/0248147 A1 * | 8/2023 | Giovannetti | ......... A47B 96/066 |
| | | | 248/205.1 |
| 2023/0380595 A1 * | 11/2023 | Cattaneo | ............. A47B 96/066 |
| 2023/0404262 A1 * | 12/2023 | Cattaneo | ................. F16B 12/24 |
| 2024/0016291 A1 * | 1/2024 | Cattaneo | ............. A47B 96/066 |

FOREIGN PATENT DOCUMENTS

| | | | | |
|---|---|---|---|---|
| EP | 1228721 A1 * | 8/2002 | .......... | A47B 96/066 |
| EP | 2609833 | 7/2013 | | |
| EP | 3436710 | 12/2020 | | |
| ES | 2313856 | 3/2009 | | |
| IT | MI20030052 U1 | 8/2004 | | |
| SE | 430708 | 12/1983 | | |
| WO | 2008076089 | 6/2008 | | |
| WO | 2015158622 | 10/2015 | | |

* cited by examiner

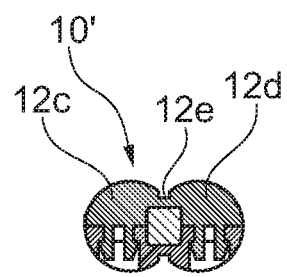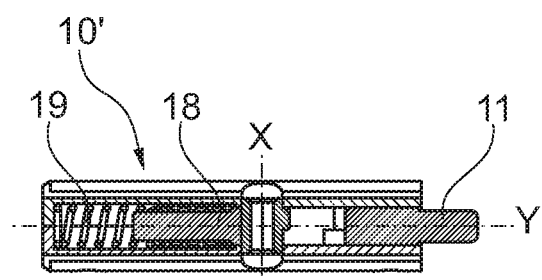
Fig. 12   Fig. 13
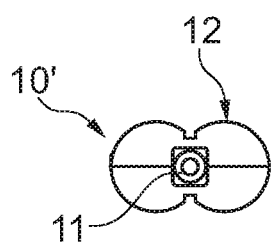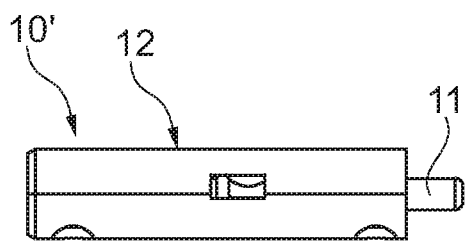
Fig. 14   Fig. 15
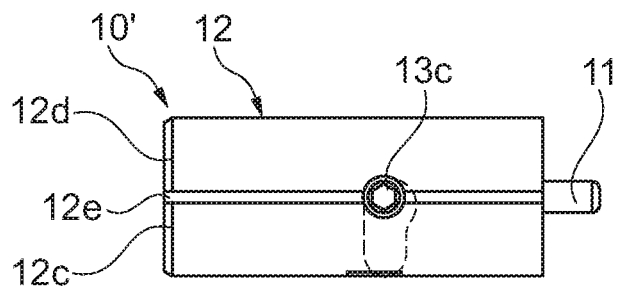
Fig. 16
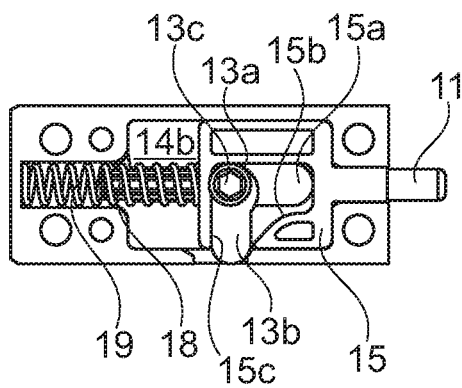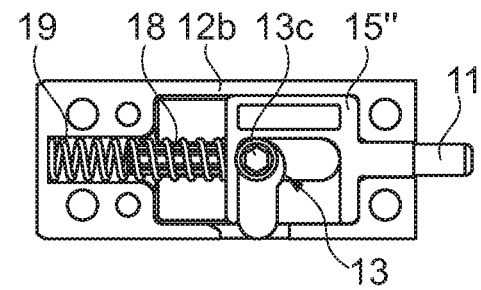
Fig. 17   Fig. 17A

SUPPORT DEVICE FOR FURNITURE SHELVES

FIELD OF THE INVENTION

The present invention relates to a supporting device for furniture shelves for the reversible connection of a shelf to opposite shoulders of a piece of furniture.

The device according to the present invention responds to the need, felt in the field, for being able to provide furniture shelves with increasingly miniaturized supporting devices which form a connection with the shoulders of a piece of furniture, so as to minimize the aesthetic impact and even completely disappear from sight when the shelf is assembled.

STATE OF THE ART

Devices of this type are commonly called shelf brackets in the field, and have the function of stably, but removably, supporting and fixing a horizontal element (shelf) of a piece of furniture between two vertical elements commonly called shoulders.

Said shelves and said shoulders are arranged perpendicular to each other.

Shelf brackets of this type are known in the state of the art, but are not without drawbacks.

More specifically, one of the drawbacks that affect devices of the type known in the state of the art lies in the fact that they are not completely invisible when the device is assembled and consequently do not limit the aesthetic impact on the furniture.

A further drawback that affects devices of the known type lies in the fact that generally, they cannot be indifferently actuated from above or from below, thus forcing the operator to predict, already in the assembly phase of the device on or within the shelf, how said shelf must be positioned inside the furniture.

SUMMARY OF THE INVENTION

In light of the above, the undertaking of the present invention is to solve the drawbacks affecting supporting devices for shelves, also called shelf-bracket devices, of the type known in the state of the art.

Within this undertaking, the objective of the present invention is to provide a supporting and fixing device for furniture shelves (shelf bracket), which has at the same time a minimal aesthetic impact and which allows an easy and rapid assembly and disassembly of the shelf with respect to the shoulders.

An objective of the present invention is also to provide a supporting and fixing device for shelves that is more versatile in the design and installation phase of the furniture, in particular capable of minimizing, if not completely cancelling, the aesthetic impact, proving to be invisible both when used with shelves intended to be seen from above by the user, and with shelves intended to be seen from below, allowing all traces of the presence of the device to be completely eliminated from sight, together with the access holes for the maneuvering tools required for actuating the device.

The above-mentioned undertaking, as also the objectives indicated above, and others that will appear more evident further on, are achieved by a supporting device for furniture shelves for the reversible connection of a shelf to the shoulders of a piece of furniture according to the enclosed claim 1.

Further characteristics of the preferred embodiments of the device according to the present invention described in the present patent application are the subject of the dependent claims.

LIST OF FIGURES

Further characteristics and advantages will become more evident from the description of a preferred but non-exclusive embodiment of the supporting device for furniture shelves for the reversible connection of a shelf to the shoulders of a piece of furniture illustrated by way of non-limiting example with the aid of the enclosed drawings in which:

FIG. 1A is a vertical sectional view illustrating a first exemplary and non-limiting embodiment of the invention, wherein a supporting device for shelves (shelf bracket) according to the present invention is incorporated inside a shelf and which is in assembly position with respect to a shoulder of a piece of furniture, the device being in a non-operating condition in which the pin is not inserted within the corresponding housing seat formed on the shoulder, the device being operable from below, a hole F having been produced for the access of the tool in the lower surface of the shelf;

FIGS. 5 and 6 show non-sectional front and side views respectively of the shelf-bracket supporting device according to the first embodiment and of which FIGS. 3 and 4 represent sectional views;

FIGS. 12 to 20 show the same views as in FIGS. 3 to 11 but of a shelf-bracket supporting device according to the present invention in accordance with a second embodiment;

FIGS. 17A, 18A, 19A and 20A show an alternative embodiment of the shelf-bracket supporting device shown in FIGS. 17, 18, 19 and 20 respectively;

Figure 37:
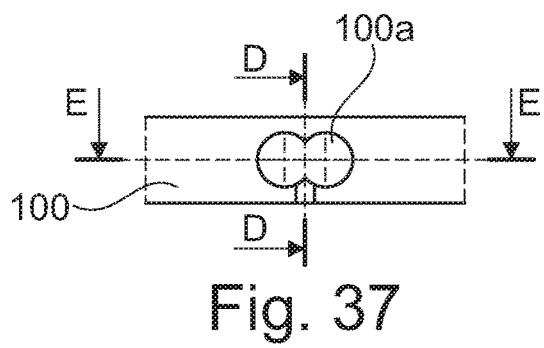
Figure 38:
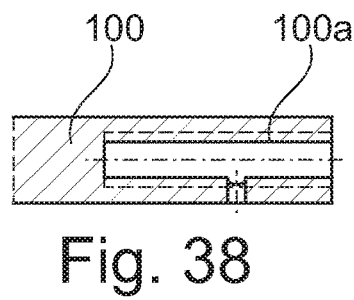
Figure 39:
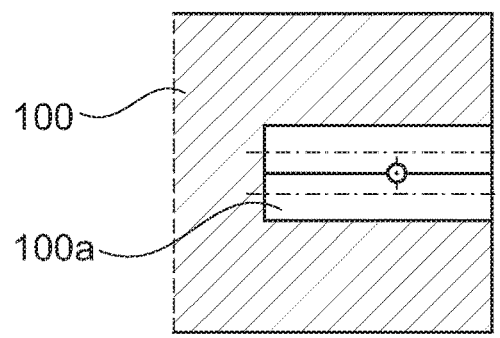
Figure 40:
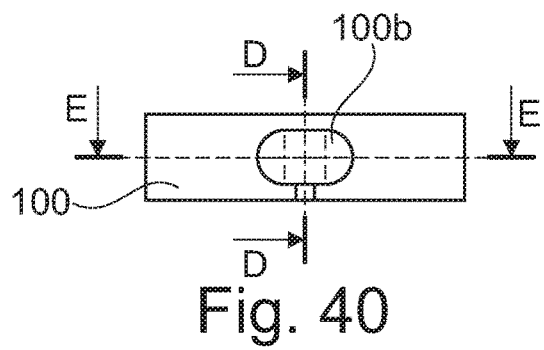
Figure 41:
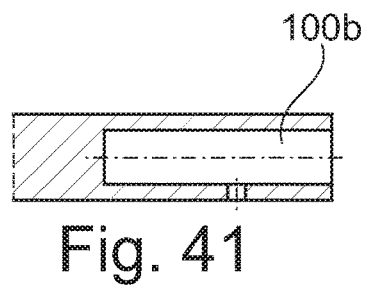
Figure 42:
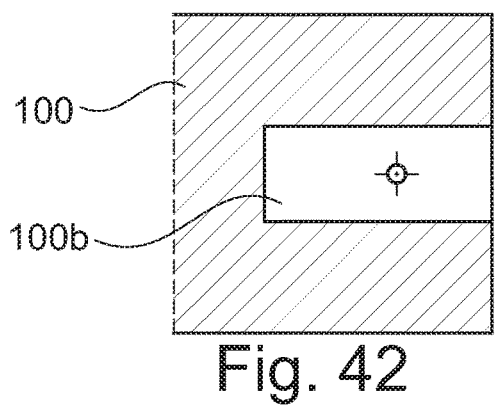
Figure 43:
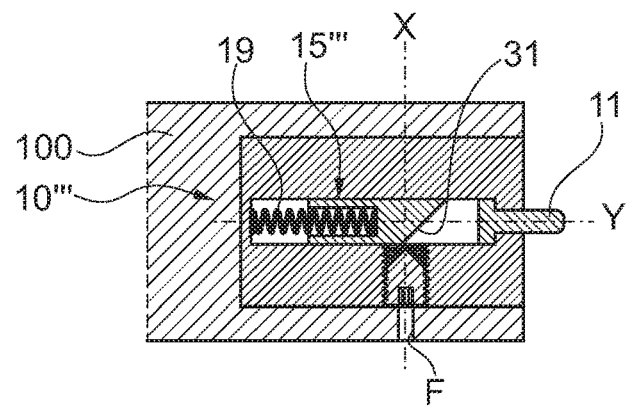
Figure 44:
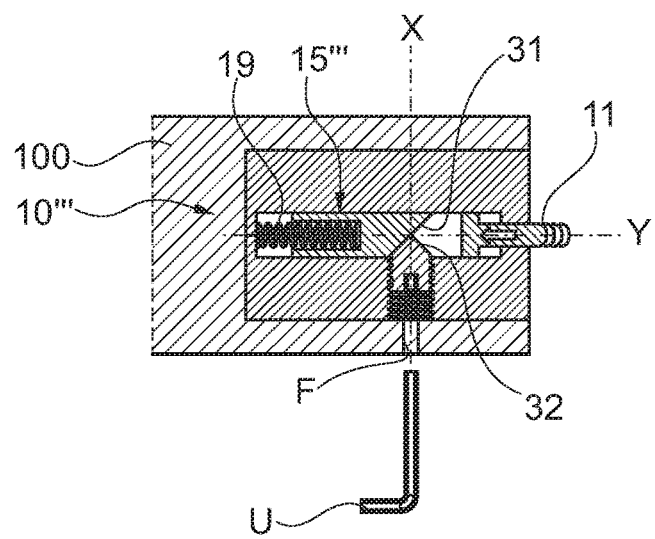
Figure 45:
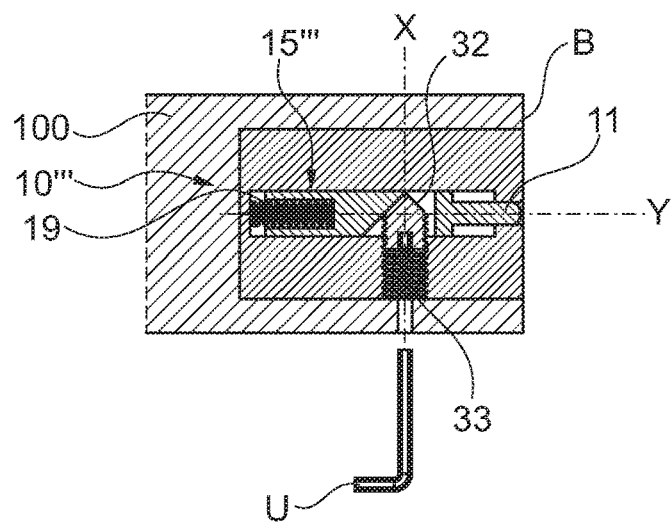
Figure 46:
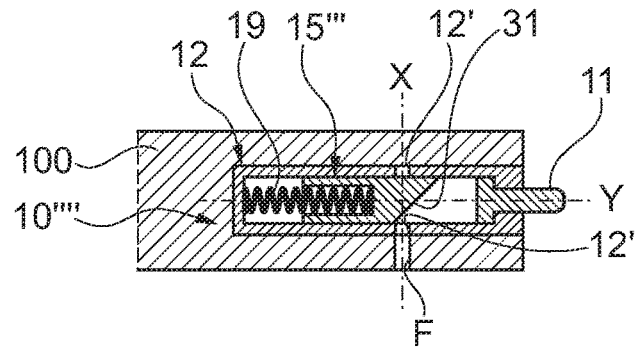
Figure 47:
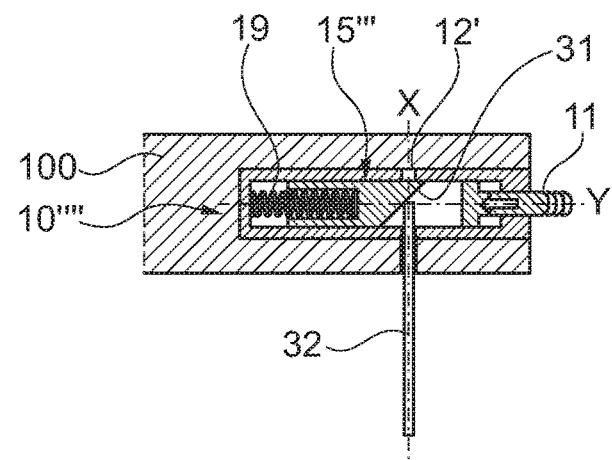
Figure 48:
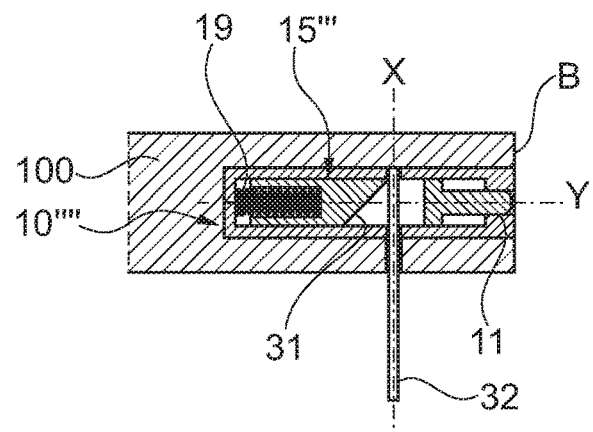
Figure 49:
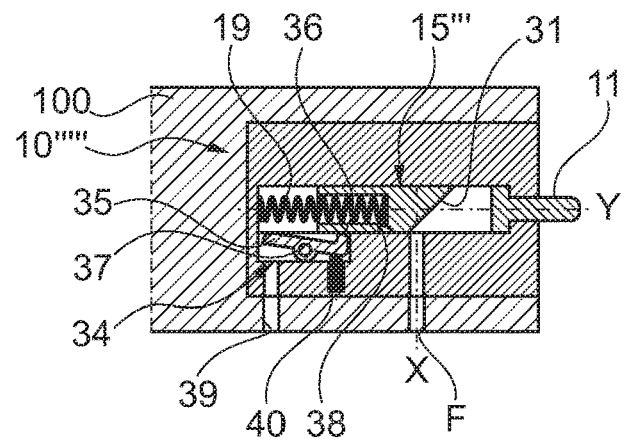
Figure 50:
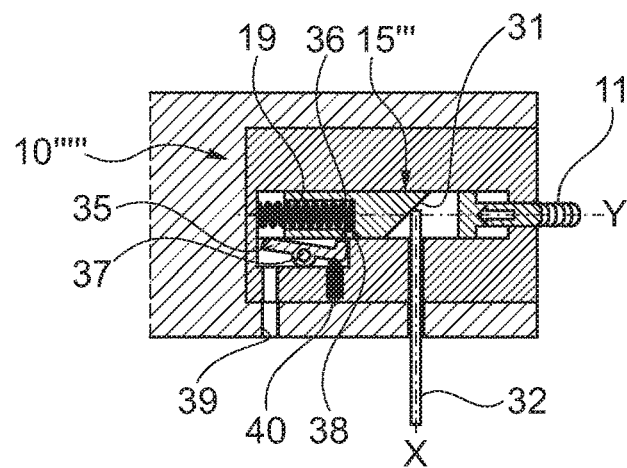
Figure 51:
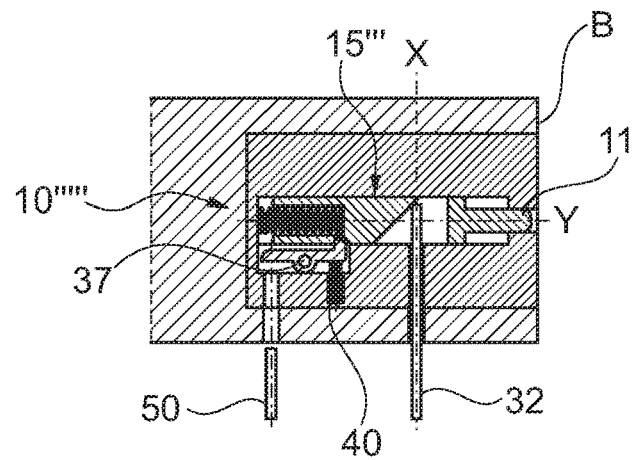
Figure 52:
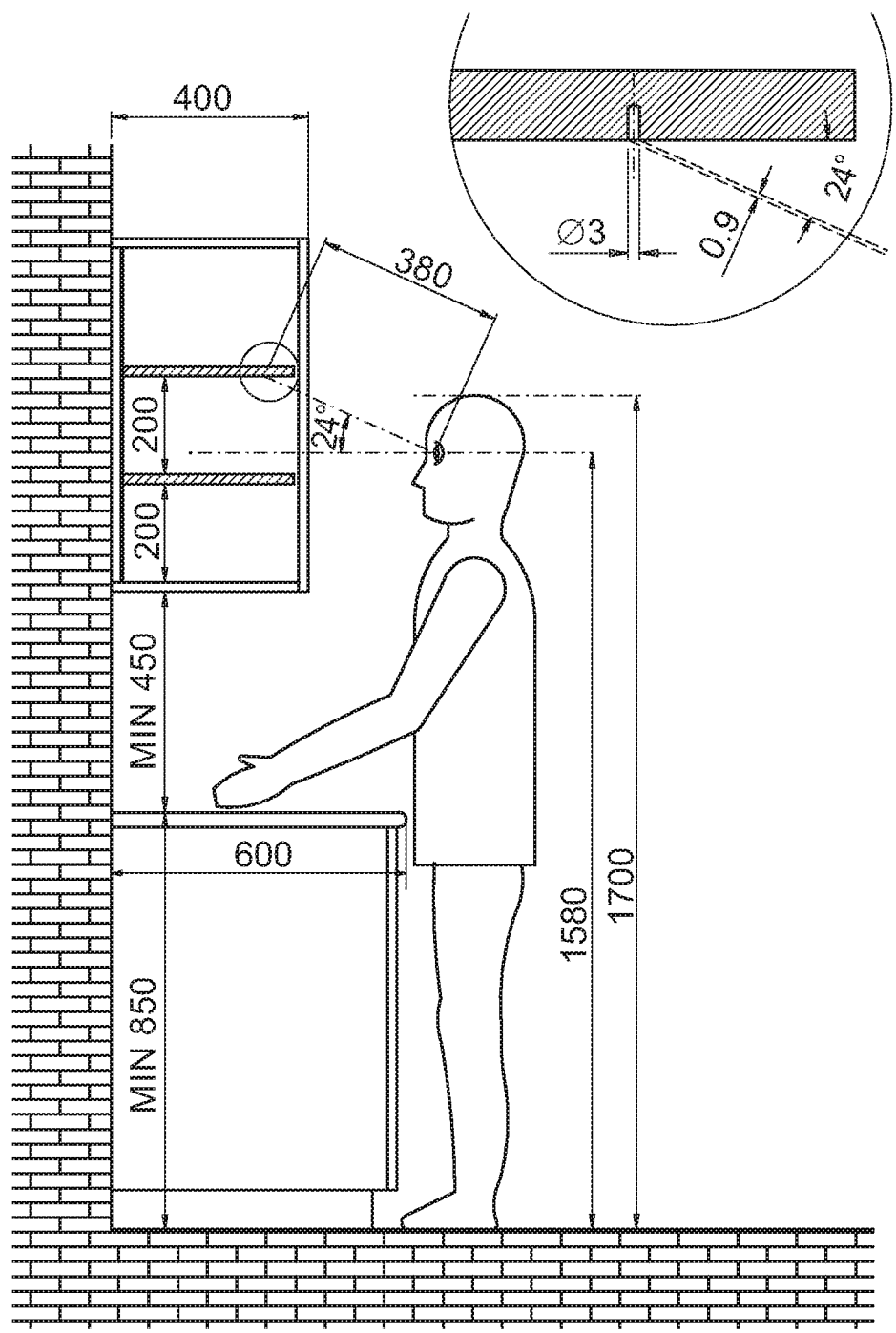

FIG. 37 schematically illustrates a possible bilobed shape of a housing hole obtained in a shelf for housing the shelf-bracket device according to the invention;

FIGS. 38 and 39 respectively show the section according to the plane D-D and the section according to the plane E-E of FIG. 37;

FIG. 40 schematically illustrates a possible oval shape of a housing hole obtained in a shelf for housing the shelf-bracket device according to the invention;

FIGS. 41 and 42 respectively show the section according to the plane D-D and the section according to the plane E-E of FIG. 40;

FIGS. 43 to 45 illustrate a fourth embodiment of the shelf-bracket supporting device according to the present invention in different operating positions;

FIGS. 46 to 48 illustrate a fifth embodiment of the shelf-bracket supporting device according to the present invention in different operating positions;

FIGS. 49 to 51 illustrate a sixth embodiment of shelf-bracket supporting device according to the present invention in different operating positions;

FIG. 52 schematically illustrates how the shelf-bracket supporting device according to the present invention is suitably sized for allowing the creation of a hole having an extremely small diameter in the shelf where it must be installed, which is invisible to the user.

DETAILED DESCRIPTION OF THE INVENTION

With particular reference to the attached figures from 1A to 11, a device 10 for supporting furniture shelves is described, for the reversible connection of a shelf 100 to opposite shoulders 200 of a piece of furniture, according to a first preferred embodiment of the present invention.

The supporting device 10 according to the present invention is of the type suitable for creating a connection by means of a pin 11 associated with the shelf 100 and configured for protruding from the transverse edge B of said shelf 100 and suitable for being inserted into a corresponding receiving hole 201 obtained on the shoulder 200 of a piece of furniture.

With respect now to the invention, the device 10 comprises a main body 12 with which movable engagement means 15 are slidingly associated, in turn associated with a pin 11.

The device 10 is configured for being inserted within the thickness of a shelf 100 and comprises movable engagement means 15 which are sliding with respect to the main body 12 along a sliding direction Y between a first non-operating position in which the pin 11 does not protrude from the transverse edge B of the shelf 100, and a second operating position in which the pin 11 protrudes outwardly from the shelf 100.

Said main body 12 is advantageously box-shaped and is produced by the coupling of two half-shells, as will be more clearly illustrated hereunder.

The supporting device 10 according to the present invention comprises actuation means 13 of said engagement means 15 which can be rotated around an axis X substantially orthogonal to the sliding direction Y of said engagement means 15, and further comprises movement-transmission means 13b, 15c, 15b suitable for transforming the rotational movement around the rotation axis X of said actuation means 13 into the translational movement along the sliding direction Y of said movable engagement means 15.

According to the first preferred embodiment of the device according to the present invention illustrated in detail in FIGS. 3 to 11, the movable engagement means 15 comprise a slide 15 with which the pin 11 is integrally associated.

The slide 15 advantageously comprises an outlet 15a configured for receiving the actuation means 13 which, in this first embodiment, preferably also comprise a cam 13 which comprises a substantially hollow cylindrical central body 13a whose central hole 13c is shaped for receiving a maneuvering tool. Thanks to this configuration of the slide 15, it can translate, as will be better seen hereunder, with respect to the main body 12 whereas said cam 13 is advantageously held in position thanks to the presence of holes 16a, 16b formed in the main body 12 itself.

Said cam 13 comprises an elongated body having a shaped profile 13b configured for interacting with the shaped internal profile 15b, 15c of the slide 15, so as to transform the rotational motion of said cam 13 around the axis X coinciding with the axis of said shaped central hole 13c of said hollow cylindrical body 13a, in the translational movement of said slide 15 in the direction Y.

In the text, the terms front, rear, top, bottom, move forwards, move backwards and similar spatial references all refer to the device as illustrated in the figures wherein the front portion of the device is that designed for facing the outside of the shelf 100, in particular by its transverse edge B, with the device assembled, i.e. that from which the pin 11 can protrude.

With reference to FIGS. 1A to 2B, for example, the front part of the device 10 is that on the right in the figure, towards the shoulder 200 of the furniture, whereas the rear part is the opposite part, which is against the back wall of the receiving seat formed within said shelf 100.

Figure 8:
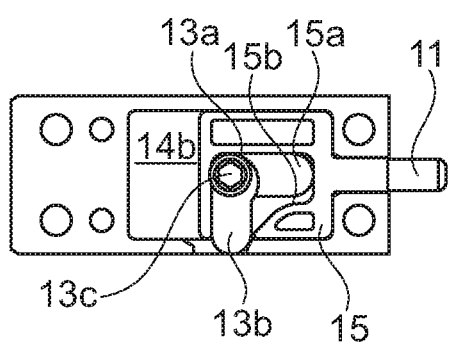
FIG. 8 is a view from above of the shelf-bracket supporting device of the present invention according to the first embodiment in a partially disassembled condition.

When it is described that the pin moves backwards, this means that the pin moves from right to left in the view from above of FIG. 8, for example, returning within the perimeter of the box-shaped body 12.

When it is described that the pin moves forwards, this means that the pin moves towards the right in the view from above of FIG. 8, for example, exiting from the perimeter of the box-shaped body 12.

Returning to the description of the supporting device 10 for furniture shelves according to the first embodiment, said sliding slide 15 is housed within a specific receiving seat formed within said main body 12.

As said main box-shaped body 12 is advantageously composed of two half-shells 12a, 12b, each of them provides a respective portion of receiving seat 14 (composed of the two half-seats 14a, 14b) of said slide 15.

Figure 3:
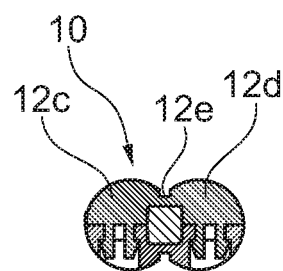
FIG. 3 is a sectional front view with a vertical plane of the shelf-bracket supporting device of the present invention according to the first embodiment shown in FIGS. 1A to 2C.
Figure 4:
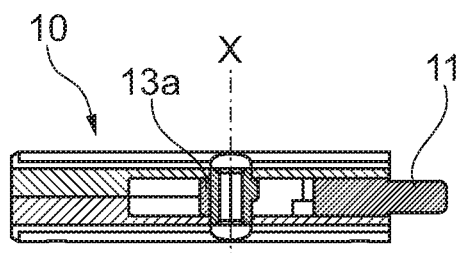
FIG. 4 is a sectional side view with a vertical median plane of the shelf-bracket supporting device of the present invention according to the first embodiment shown in FIGS. 1A to 2C.
Figure 5:
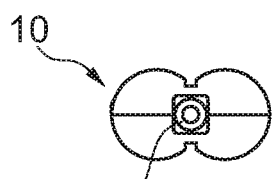
Figure 6:
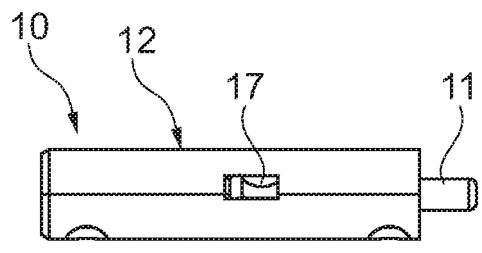
Figure 7:
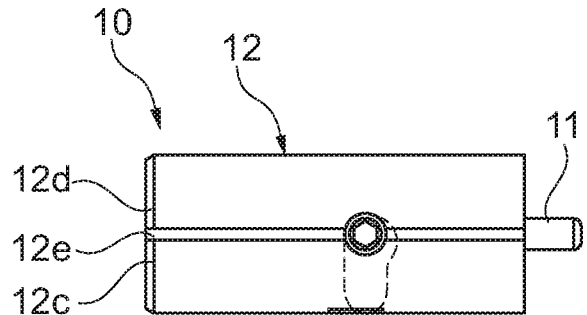
FIG. 7 is a view from above of the shelf-bracket supporting device of the present invention according to the first embodiment.

A receiving hole 16a, 16b is also provided on each of said half-shells 12a, 12b, configured for receiving the central body 13a of said cam 13, and has, on a vertical transverse plane, a profile having two portions with rounded ends 12c, 12d, preferably with a circular section, possibly but not necessarily connected by a straight central section 12e, according to what is visible, for example, in FIGS. 3 and 5.

As an alternative to the bilobed section of the main body 12 visible in FIGS. 3, 5, 12 and 14, the main body 12 can have an oval cross-section or in any case having a certain development in the transverse direction with respect to the more limited vertical development.

All of these possible alternative embodiments of the main body 12 offer the advantage of preventing rotations of the device itself on the transverse plane inside the shelf, as would otherwise occur if the device had a circular cross-section, for example, so as to obtain the automatic alignment of the device with the hole F for the maneuvering effected in the shelf.

The possibility of varying the external shape of the main box-shaped body 12 of the device allows the user to be able to choose between different types of holes in the shelf bracket according to what can be seen, for example, in FIGS. 37 to 42.

Figure 24:
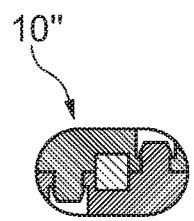
FIGS. 24 to 32 show the same views as in FIGS. 12 to 20 but of a shelf-bracket supporting device according to the present invention in accordance with a third embodiment.
Figure 25:
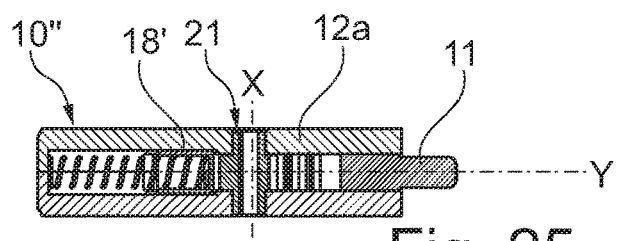
Figure 26:
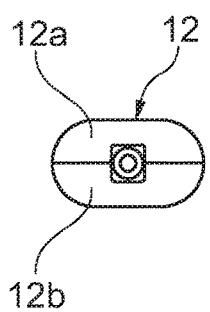
Figure 27:
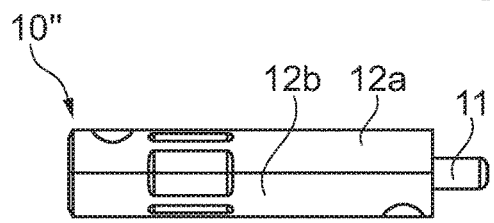
Figure 28:
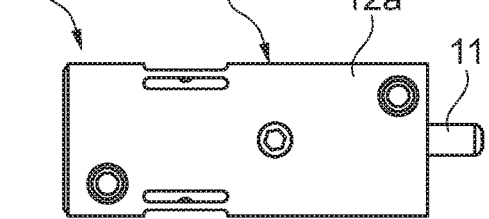
Figure 29:
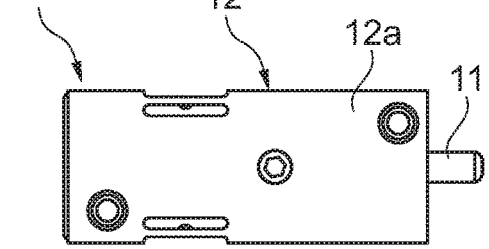
Figure 30:
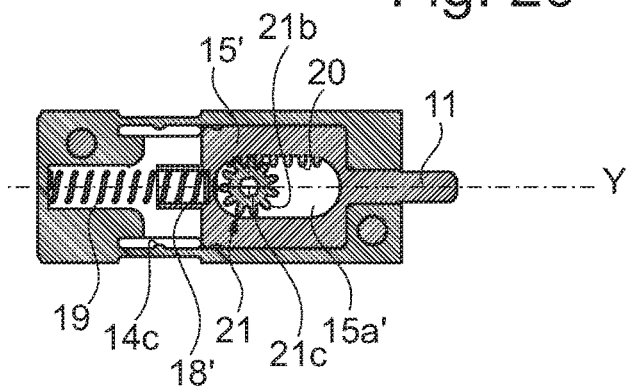
Figure 31:
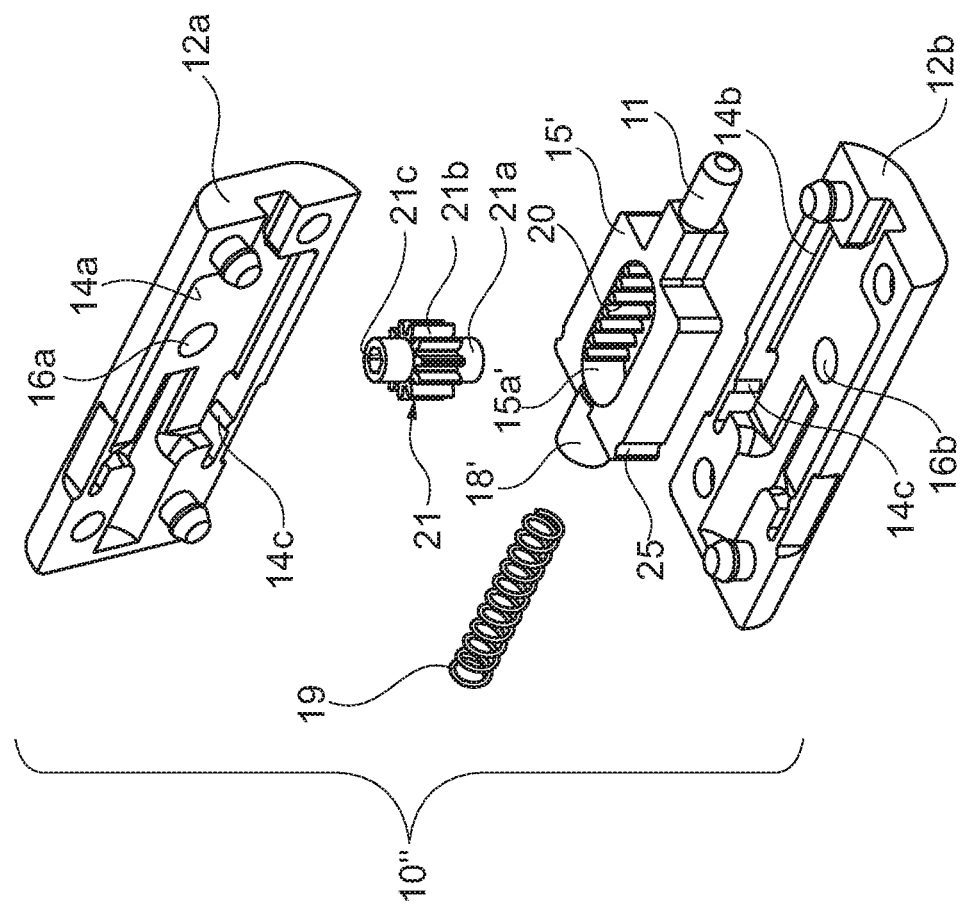

More specifically, depending on the preference, if the user prefers to create a seat in the shelf having an oval cross-section 100b as can be seen in FIG. 40 that can be obtained with a single milling operation, he can opt for a main body 12 having an external profile with an oval cross-section as can be seen for example in FIGS. 24 and 26, which, although shown with reference to the third embodiment of the shelf bracket object of the present invention shown in FIGS. 24 to 32, can also be adopted with the other embodiments described.

If, on the other hand, he prefers to create a seat having a bilobed cross-section 100a as can be seen in FIG. 37 that can be obtained through drilling operations, he can opt for a main body 12 having an external profile with a bilobed cross-section as can be seen for example in FIGS. 3, 5, 12 and 14.

The receiving holes 16a, 16b are aligned with each other along the axis X, with the device assembled, and form access for a tool to the shaped central hole 13c of said cam 13.

Said cam 13 is therefore housed with the ends of the cylindrical central body 13a within said receiving holes 16a, 16b and is positioned inside the outlet 15a suitably provided on the slide 15. According to the first preferred embodiment illustrated by way of example in the attached figures, when, by means of the tool U, the cam 13 is caused to rotate clockwise around the axis X passing through its central hole 13c, as can be seen for example in FIGS. 21 to 23, it abuts, with the end of its elongated body 13b, against the substantially straight internal wall 15c of the slide 15 according to what is shown for example in FIG. 22, causing the slide 15 itself to move towards the left, i.e. its withdrawal, which involves the withdrawal of the pin 11.

Figure 21:
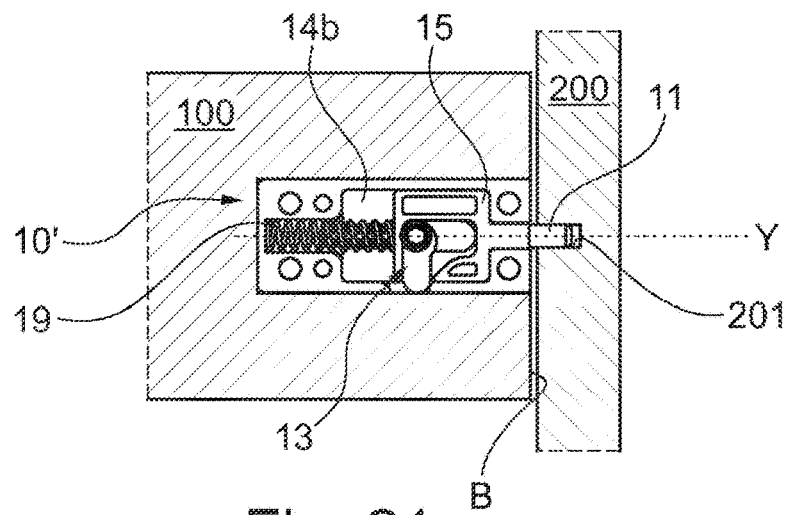
FIGS. 21 to 23 show sectional views from above of the device according to the present invention in accordance with the second embodiment in different operating phases.
Figure 22:
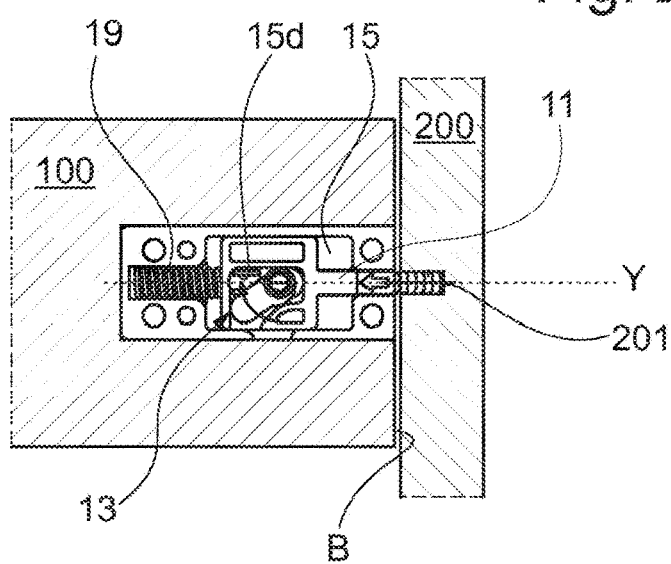
Figure 23:
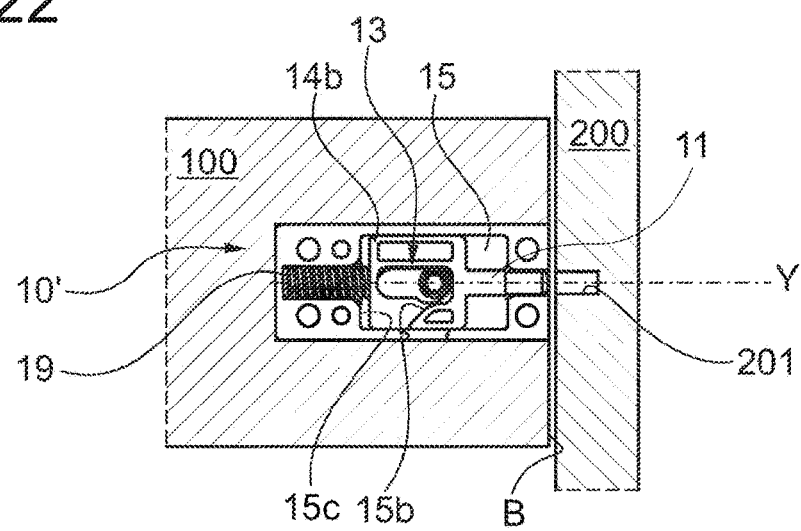

When the clockwise rotation of the cam 13 is completed, as shown in FIG. 23, it is arranged along the direction of the axis Y and a receiving groove 15d is advantageously provided on said straight internal wall 15c of said cam 15, suitable for receiving the end of the elongated body 13b of the cam 13 so that the device can remain blocked in a withdrawn slide/withdrawn pin position corresponding to the first non-operating position even without the user acting on the cam 13 with the tool U, and also in contrast to the action of any elastic means, provided for example in the embodiment of FIGS. 21 to 23.

When the operator intervenes again by activating the cam 13 in counter-clockwise rotation, thus returning the cam itself from the position of FIG. 23 to the position of FIG. 21 as can also be seen in FIGS. 8, 9, 17 and 18, the cam 13 pushes the slide towards the right in the drawings, or in an advanced position, becoming abutted against the internal wall 15b of said slide 15.

In the second preferred embodiment shown in FIGS. 12 to 20, the movement of the slide 15 in the forward direction is not only determined by the cam but also by the action of the spring 19.

In a variant shown in FIGS. 17A to 20A of the second preferred embodiment of the device 10' according to the present invention, the slide 15" may not have a shaped portion of the internal surface of said slide 15" but rather an internal profile comprising both the internal side walls of the slide 15" substantially flat 15c". When the spring 19 is present, in fact, the advancement of the slide 15" can also take place due to the action of the spring only, the intervention of the operator with the maneuvering tool U only being required for releasing the elongated body 13b of the cam from the retention means comprising said receiving groove 15d formed on the rear wall of the slide, as previously described.

The device 10' according to the present invention in accordance with the second embodiment illustrated in FIGS. 12 to 20A, which comprises, as already mentioned, elastic means 19 which act so as to keep the slide 15, 15" in an advanced position corresponding to the second operating position, further provides for a third non-operating but non-blocked intermediate position in which the pin 11 is free to move backwards until it is completely withdrawn, flush with the edge of the box-shaped body 12 which in turn is flush with the edge B of the shelf with the device mounted, but in which the end of the elongated body 13b of the cam 13 is not blocked within the receiving groove 15d present on the rear internal wall 15c, 15c" of said slide 15, 15".

Figure 33:
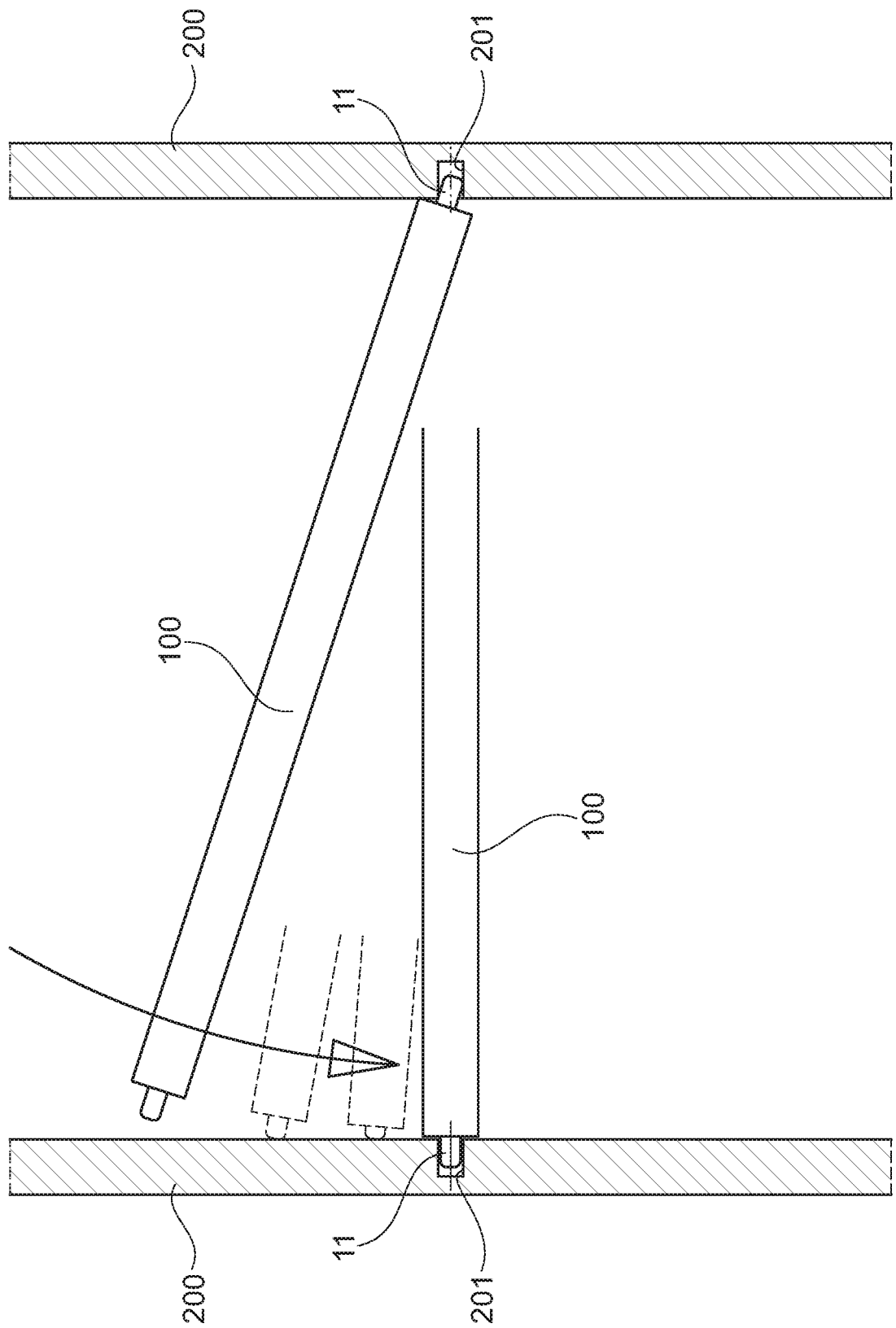
FIG. 33 shows a schematic view of the positioning and connection phases of a shelf equipped with a device according to the present invention with the shoulders of a piece of furniture.

In this third intermediate position which is not operational but not blocked, the pin 11 can move backwards and be pushed and kept in the withdrawn position, for example by the external action of the shoulder 200 during the assembly operations of the shelf 100 shown in FIG. 33.

This feature allows the operator to mount the shelf 100 on the shoulders 200 by positioning the first pair of pins 11 within the seats 201 formed on the first shoulder 200 and then sliding the shelf 100 as shown in FIG. 33 until the other pair of pins 11 on the opposite edge of the shelf 100 meets the specific holes 201 provided on the second shoulder 200. If the device is in the third intermediate non-blocked condition, the pins 11 will be able to move backwards counteracting the action of the spring 19, but as soon as they are in correspondence with the holes 201 they will automatically snap into said holes 201.

With particular reference to FIGS. 1A to 2C, with the device 10 assembled and inserted within the seat specifically provided in said shelf 100, the operator must make a hole F in said shelf to allow access of the tool U to the actuation means 13 of said engagement means 15, and in particular to allow the tool U to have access to the shaped central axial hole 13*c*.

As, according to the preferred embodiment illustrated in the attached figures, said shaped central hole 13*c* of said cam 13 is advantageously pass-through, the cam 13 can be actuated in rotation by means of the tool U or by accessing the device 10 from below, i.e. from the lower part, as shown for example in FIG. 1A, and also from above, i.e. from the upper part, as shown for example in FIG. 1B.

Figure 34:
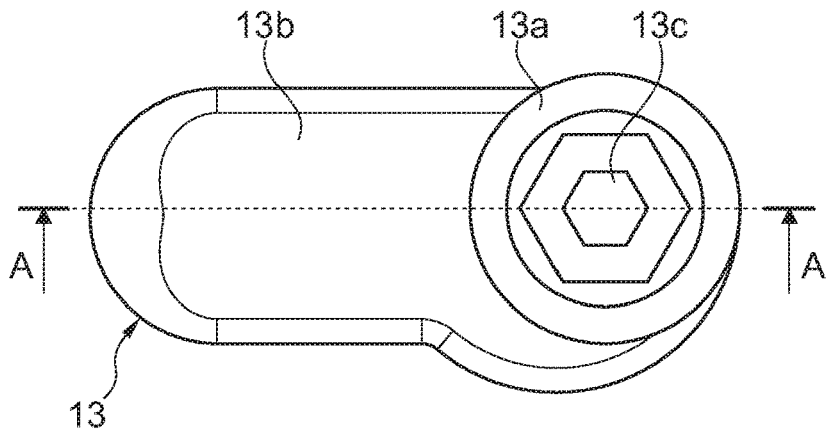
FIG. 34 shows a view from above of the cam with the pass-through hole present in the first two embodiments of the present invention described.
Figure 35:
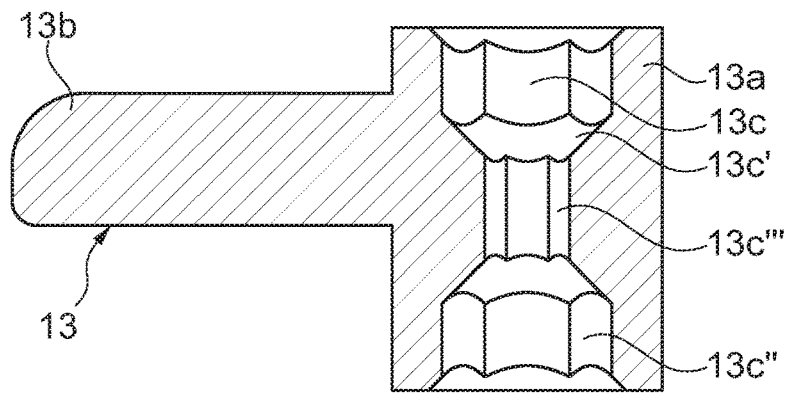
FIG. 35 shows a cross-sectional view according to the plane A-A of FIG. 34.
Figure 36:
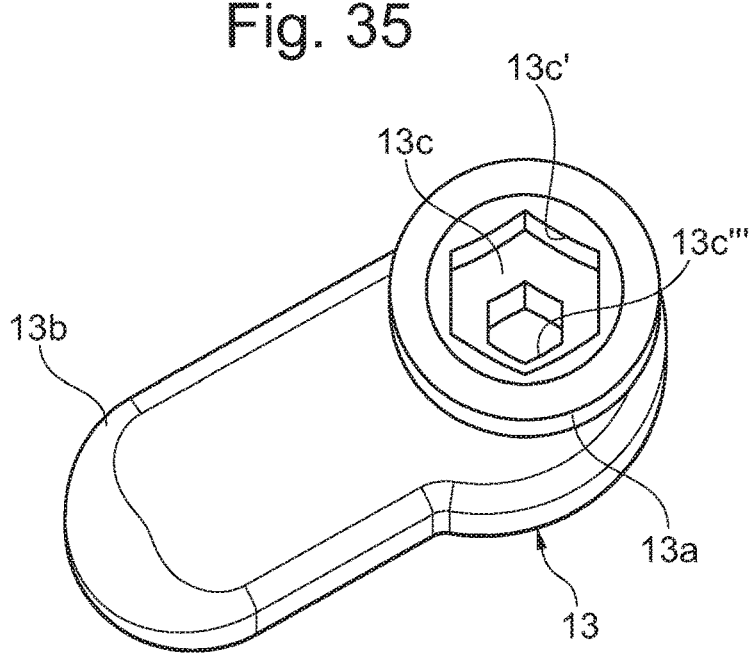
FIG. 36 shows a perspective view of the cam of FIG. 35.

With particular reference to FIGS. 34 to 36, the cam 13 can preferably comprise a central pass-through hole 13*c* shaped both above and below so as to allow the actuation of the cam itself, and therefore of the device 10, from both above and below.

The central hole 13*c* can advantageously have a first shaping 13*c*' at the top, and a second, different shaping 13*c*" at the bottom.

According to an alternative embodiment of the present invention, said first upper shaping 13*c*' and said second lower shaping 13*c*" can be of the same type, for example both for receiving hexagonal tips but having different sizes, or of a different type, for example a hexagonal tip above and a screwdriver tip below, or vice versa. A central connection section between the two upper 13*c*' and lower 13*c*" shapings may also have a third shape 13*c*''' for a different tool or for a smaller hex key.

It will therefore be up to the operator to decide whether to make holes F in the shelf in correspondence with the lower surface of the shelf (FIG. 1A) so that on observing the shelf from above, there is no visible sign of the presence of the device 10 or any hole, or in correspondence with the upper surface (FIG. 1B) of the shelf so that on observing the shelf from below, there is no visible sign of the presence of the device 10 or any hole, or on both surfaces (FIG. 1C) to allow the device 10 to be actuated both from above and from below.

Figure 9:
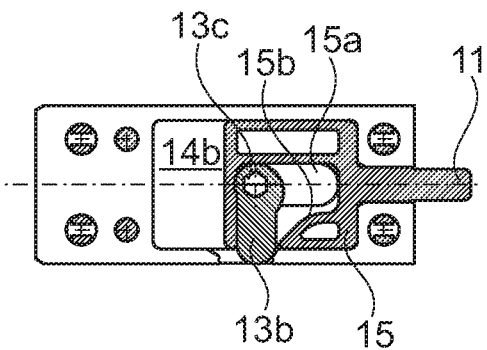
FIG. 9 is a sectional view from above with a horizontal plane of the shelf-bracket supporting device of the present invention according to the first embodiment.

As can be seen for example in FIGS. 8 and 9, the sliding direction Y advantageously coincides with the symmetry axis of the pin 11 and the main body 12.

Even more preferably, the substantially cylindrical central body 13*a* of said cam 13 is positioned with its own symmetry axis, coinciding with its own rotation axis X, arranged orthogonally with respect to the sliding direction Y of said slide 15, the central body 13*a* of the cam 13 being positioned on the symmetry axis Y of the main body 12 which defines the sliding direction of the slide 15.

With particular reference to FIGS. 8 to 11, the supporting device 10 according to the present invention in accordance with the first preferred embodiment provides that the cam 13 can be rotated around the rotation axis X passing through the shaped hole 13*c* of its own central body 13*a*, substantially cylindrical and hollow.

By rotating the cam 13, it can be brought to a first non-operating position in which said cam 13 is arranged with its own elongated shaped body 13*b* along the symmetry axis Y and is completely contained within the outlet 15*a* formed within said slide 15.

In this non-operating position, the cam 13 is abutted against the internal wall of said outlet 15*a*, in particular by inserting itself into the receiving groove 15*d* suitably provided on the internal wall 15*b* of said slide, and thus keeps the slide 15 in the withdrawn position so that the pin 11 does not protrude from the edge B of said shelf 100.

Figure 1A:
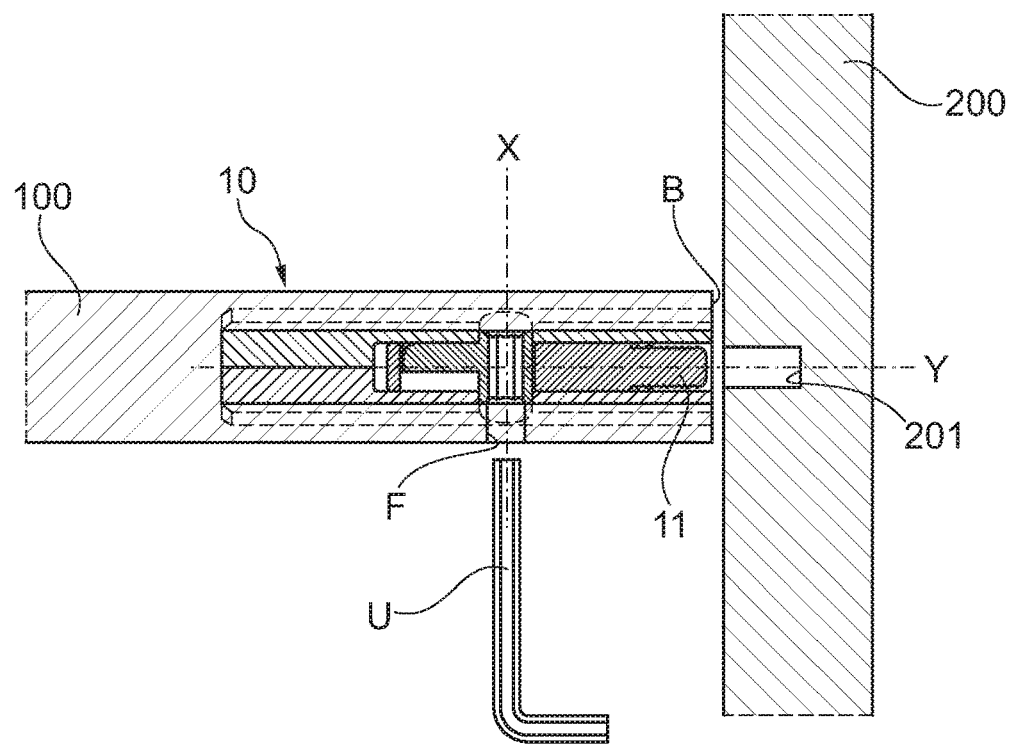
FIG. 1B shows the same vertical sectional view as FIG. 1A wherein the device can be operated from above, as a hole F has been produced for access of the tool in the upper surface of the shelf.
FIG. 1C shows the same vertical sectional view as FIGS. 1A and 1B wherein the device can be operated from both above and below, as holes F have been produced for access of the tool on both the lower and upper surface of the shelf.
Figure 1B:
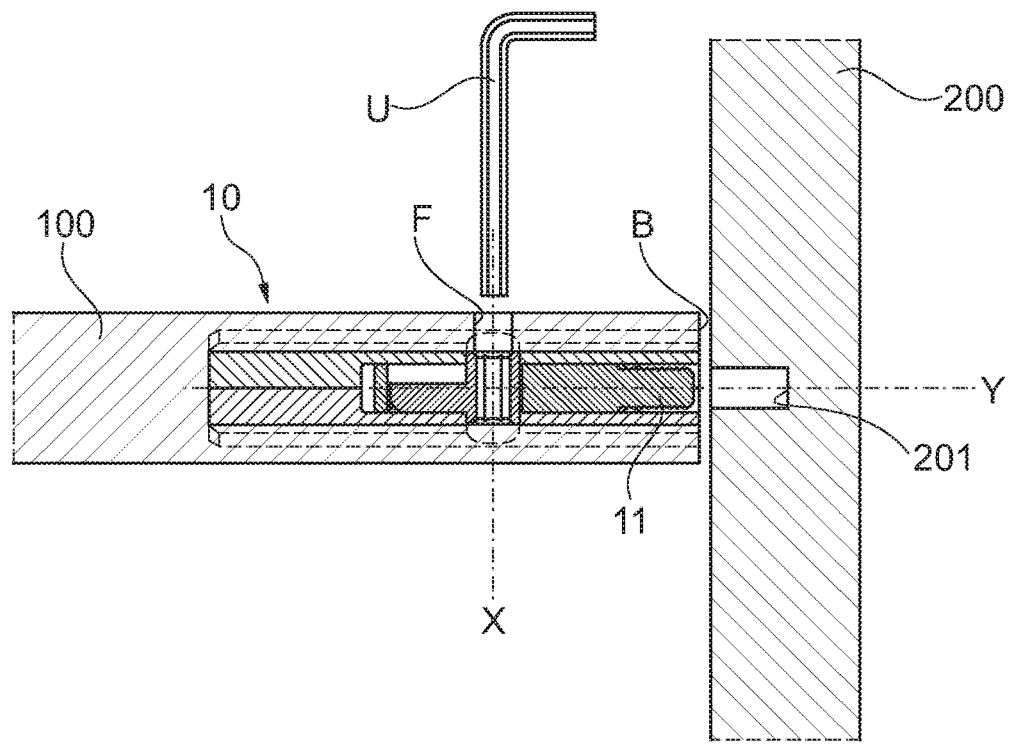
Figure 1C:
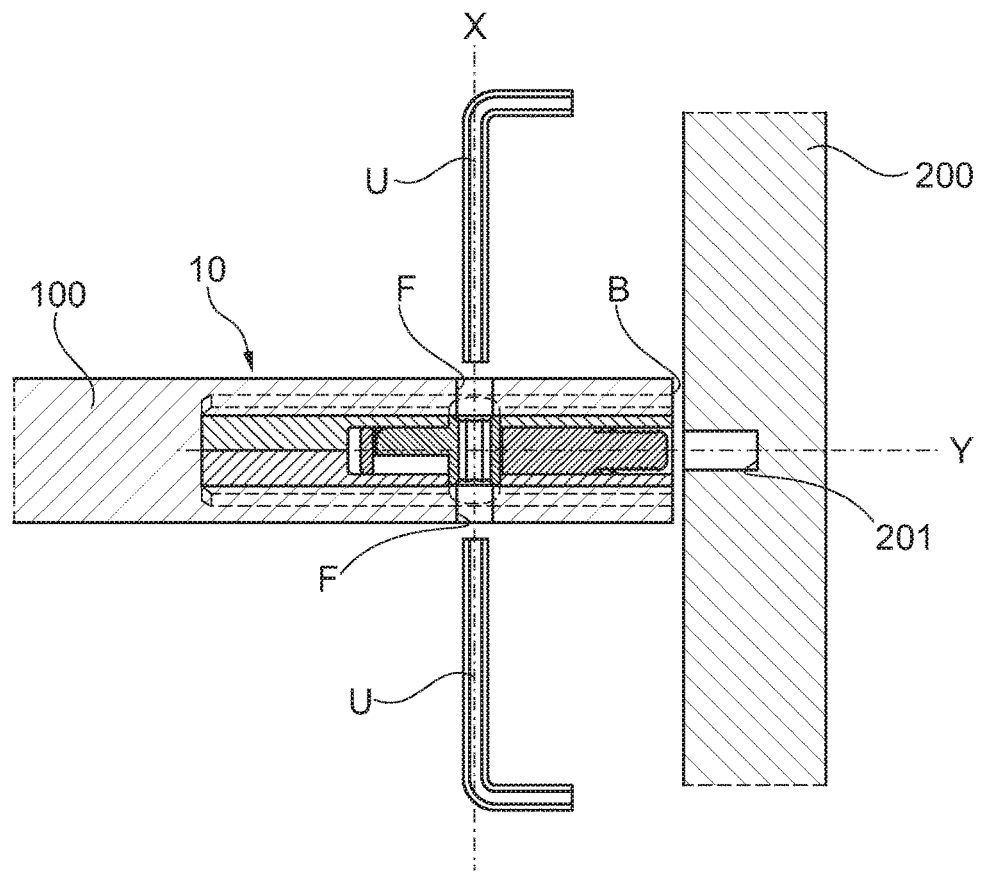
Figure 2A:
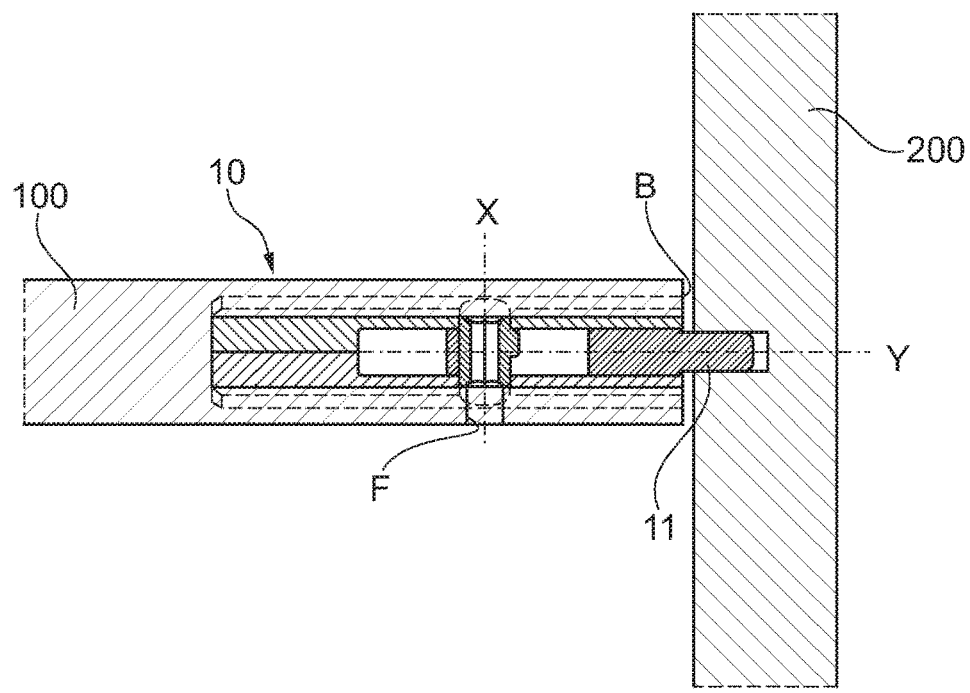
FIG. 2A is the same view as FIG. 1A wherein the supporting device is in an operating condition which ensures the connection of the shelf to the shoulder.
Figure 2B:
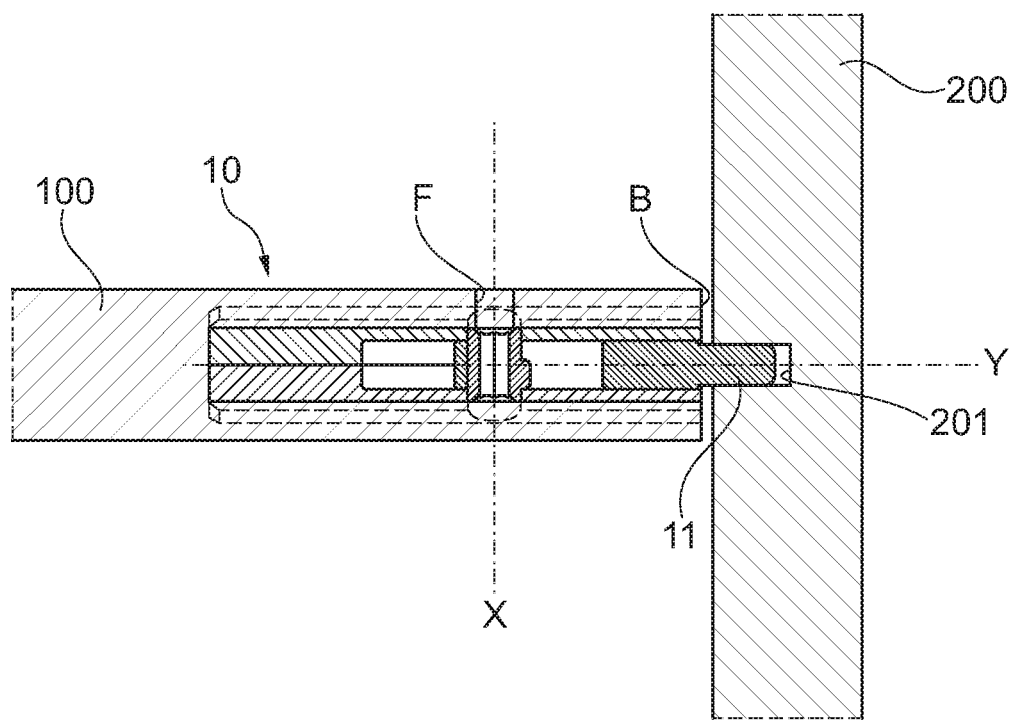
FIG. 2B is the same view as FIG. 1B wherein the supporting device is in an operating condition which ensures the connection of the shelf to the shoulder.
Figure 2C:
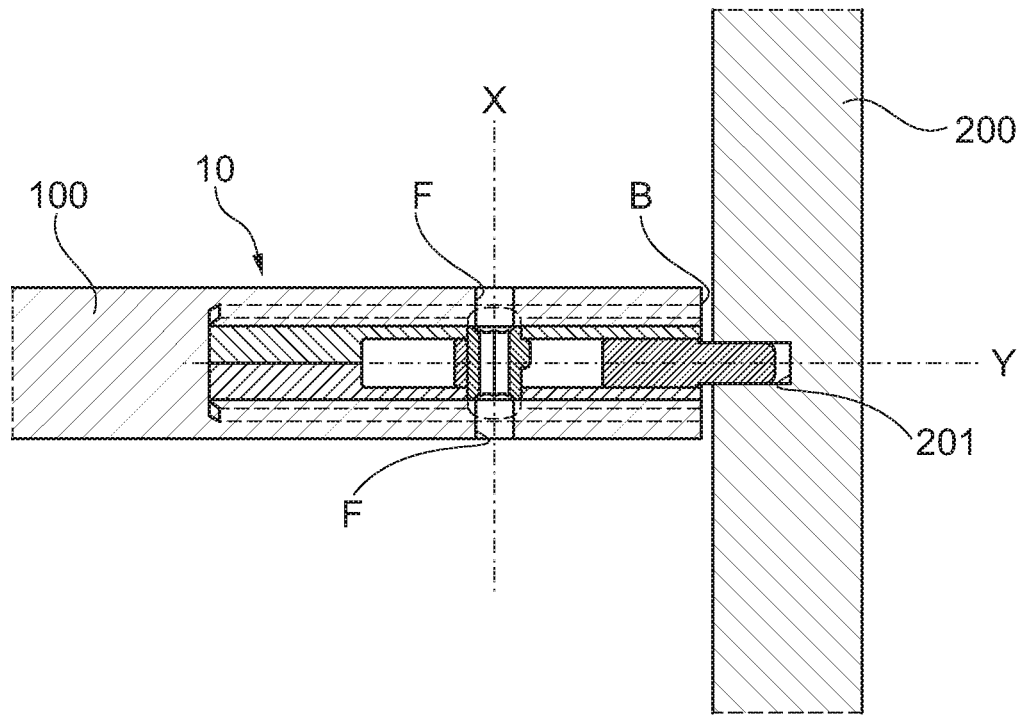
FIG. 2C is the same view as FIG. 1C wherein the supporting device is in an operating condition which ensures the connection of the shelf to the shoulder.

This non-operating condition is shown in FIGS. 1A, 1B and 1C, and can also be seen in FIG. 23, which however shows a second preferred embodiment of the present invention which is described hereunder.

Returning to the first embodiment shown in FIGS. 1A to 11, by rotating the cam 13 it can be brought to a second operating position in which it is arranged with its own elongated shaped body 13*b* arranged substantially orthogonal to said symmetry axis Y so as to be abutted against the end of its elongated body 13*b* within an abutment seat 17 (composed of the two half-seats 17*a*, 17*b*) formed on said main body 12.

Figure 11:
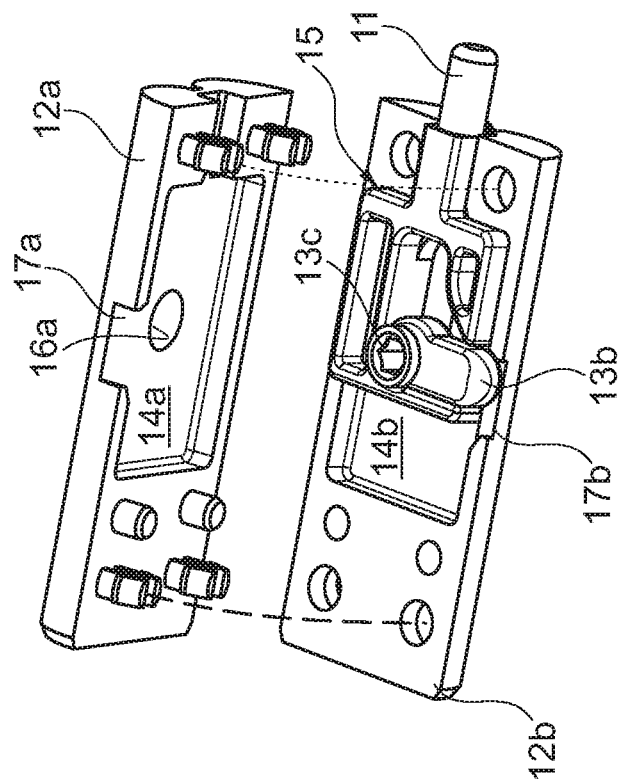
FIGS. 10 and 11 are exploded views of the shelf-bracket supporting device of the present invention according to the first embodiment.
Figure 10:
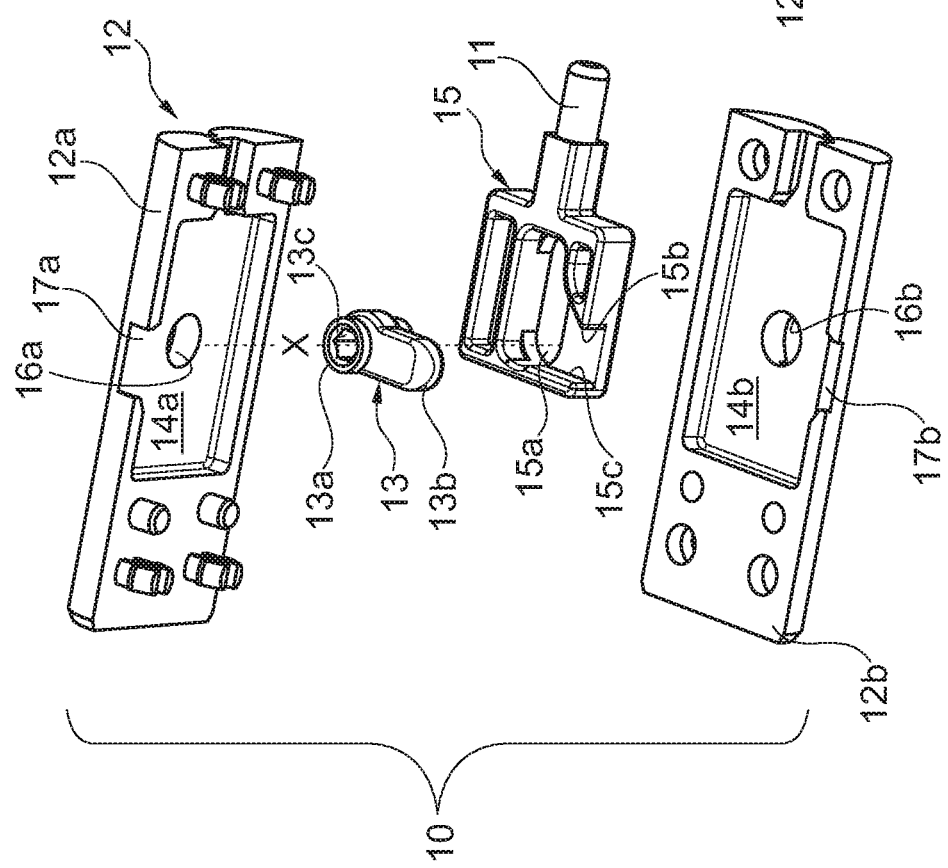
Figure 18:
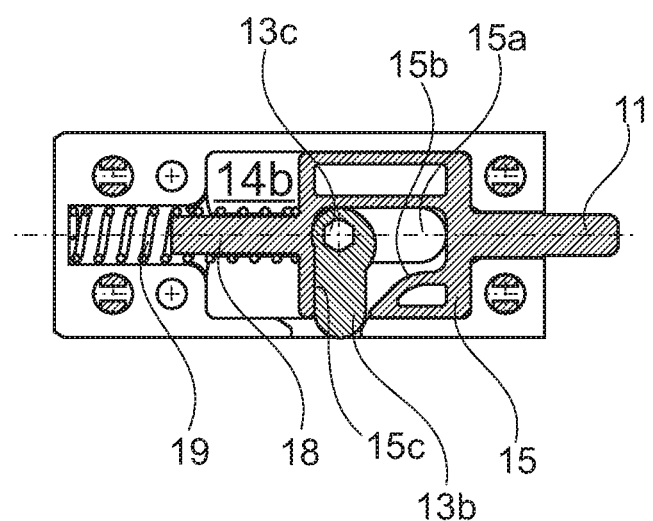
Figure 18A:
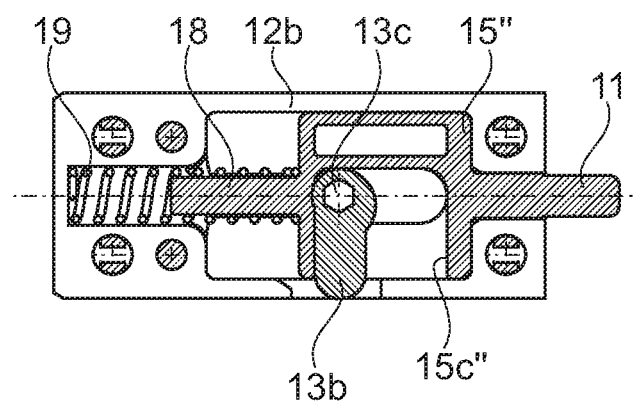
Figure 19A:
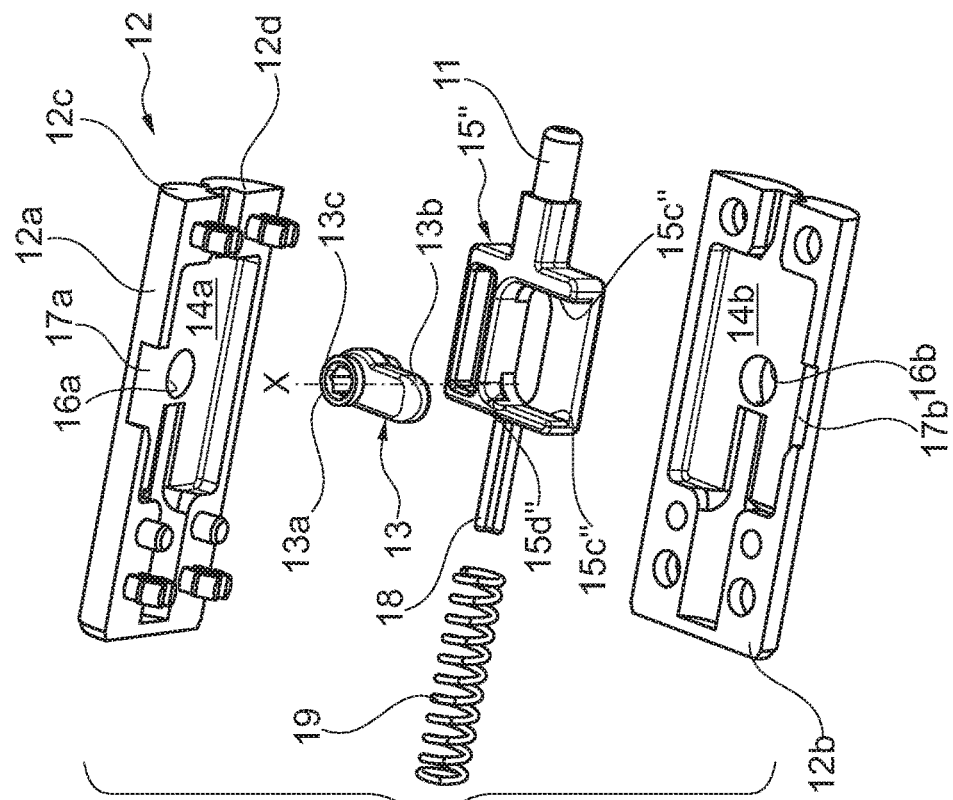
Figure 19:
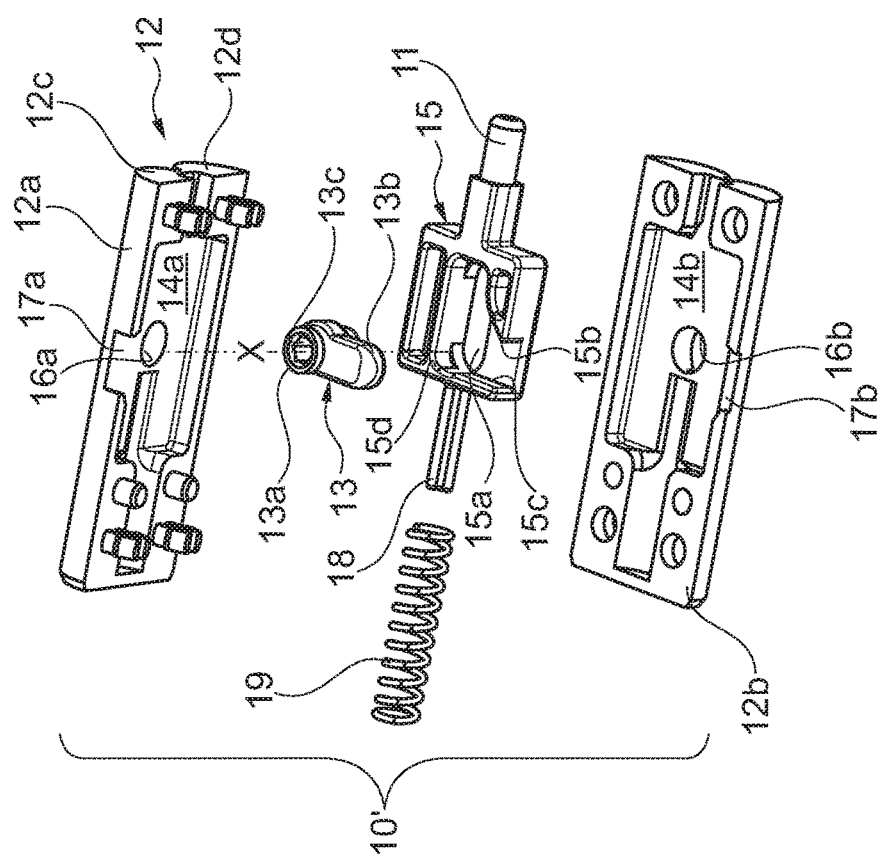
Figure 20A:
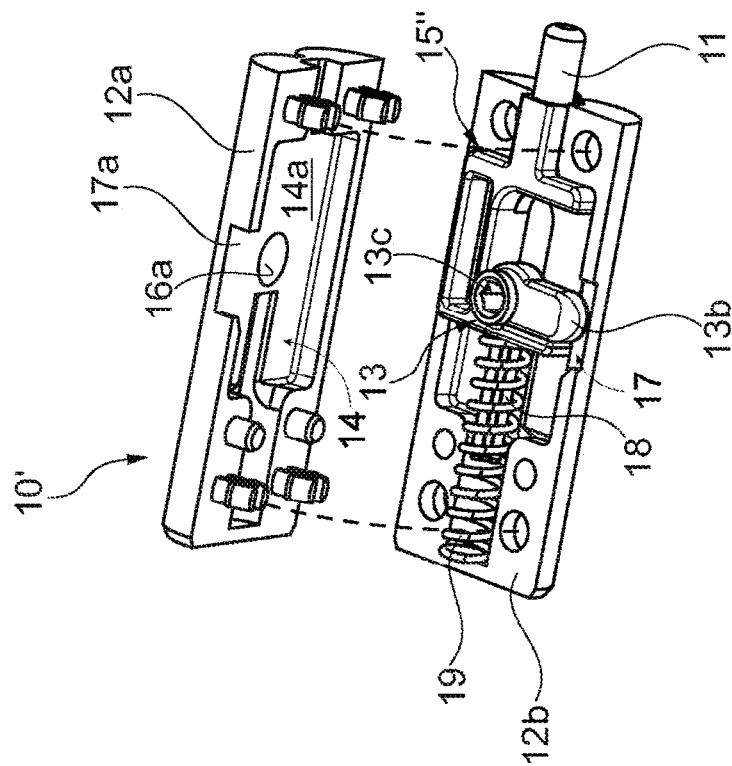
Figure 20:
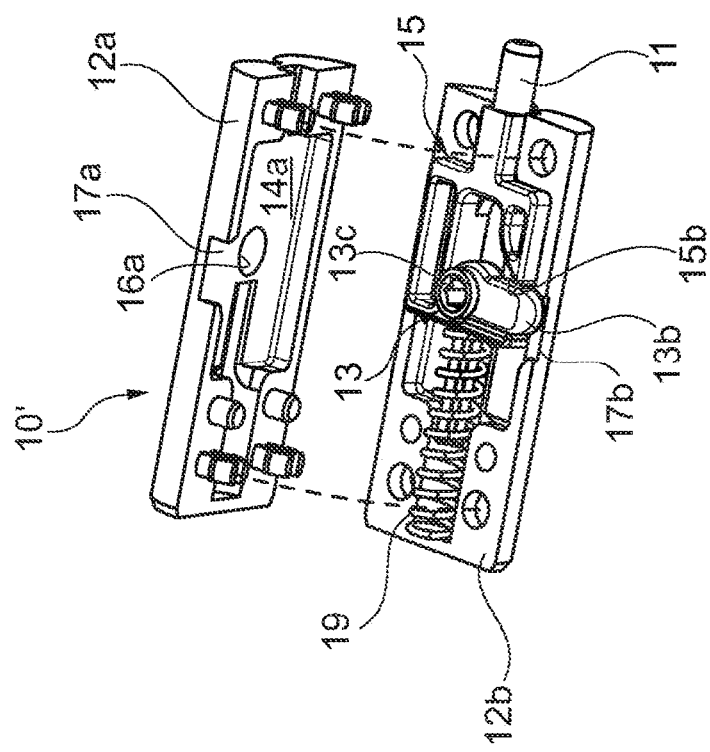

This second operating condition can be seen, for example, in FIGS. 8 and 9 and in the exploded views of FIGS. 10 and 11.

In this position, the cam 13 keeps the slide 15 in an advanced position so that said pin 11 protrudes from said shelf 100, as can also be seen, for example, in the figures from 2A to 2C.

The supporting device 10 for furniture shelves according to the present invention comprises, as already indicated, a main body 12 which is configured for being assembled within said shelf 100.

According to a preferred embodiment of the invention shown by way of example in the attached figures, the device 10 according to the invention is configured for being inserted within a shelf 100, even more preferably for being positioned "flush" with the edge B of said shelf 100 from which the pin 11 will protrude, i.e. flush with the edge B of said shelf 100 designed for facing the shoulder 200 of the piece of furniture on which the shelf is to be assembled.

The slide 15 is advantageously configured so that when it is in said first non-operating position in which it is in a withdrawn position, said pin 11 does not protrude from the edge of the main body 12 which is flush with the edge B of said shelf 100 designed for facing the shoulder 200 of the piece of furniture.

In a variant of the device 10' according to the present invention, shown by way of example in FIGS. 12 to 20, the slide 15 further comprises, in correspondence with its edge opposite the edge from which the pin 11 extends, a plug 18 having a longitudinal development and developing along said symmetry axis Y on which elastic means 19 are positioned suitable for opposing a translational backward movement of the slide 15, which as so far described entails the passage from the operating position in which said pin 11 projects towards the outside the shelf 100, to the non-operating position wherein said pin 11 does not protrude from the shelf 100, naturally when the device 10' is assembled on a shelf 100.

Said elastic means 19 are advantageously interposed between an internal abutment surface of said main body 12 and the slide 15.

These elastic means ensure that the slide 15 and consequently the pin 11 are kept in an advanced/operating position even when vibrations, for example due to the movement of dishes or furnishings in general, can be transmitted from the piece of furniture on which the shelf-bracket device is mounted to the device 10' itself, making the slide 15 and consequently the pin 11 move backwards.

According to the preferred embodiment of the supporting device 10' shown in FIGS. 12 to 23, said elastic means are composed of a helical spring 19 which is advantageously fitted coaxially with said plug 18.

As an alternative to the plug 18, said elastic means 19 can also be inserted within a tubular receiving seat 18', as shown for example in FIGS. 25, 30, 31 and 32 relating to a third preferred embodiment of the present invention.

The functioning of the device 10' according to this second preferred embodiment corresponds entirely to what has been described so far with reference to the first embodiment, from which this variant differs exclusively in the presence of the spring which keeps the pin 11 protruding from the edge B of the shelf 100 and in the engaged condition when the shelf 100 is assembled to a shoulder 200.

With particular reference to FIGS. 24 to 32, a third preferred embodiment of the supporting device 10" for furniture shelves according to the present invention is now illustrated, wherein said movable engagement means comprise a slide 15' with which the pin 11 is integrally connected, wherein said slide 15' differs from what has been seen above with reference to the other embodiments in that it comprises a rack 20, for whose actuation the device 10" comprises actuation means 21 of said engagement means 15' which in turn comprise a pinion 21 which can be rotated around the axis X substantially orthogonal with respect to the sliding direction Y of said rack 20.

The slide 15' advantageously comprises an outlet 15a' within which said rack 20 is provided.

Furthermore, as already indicated, said outlet 15a' of said slide 15' receives said actuation means, which in turn comprise a pinion 21 having a substantially cylindrical central body 21a within which a central hole 21c shaped for receiving a maneuvering tool is formed, and a notched portion 21b suitable for interacting with said rack 20 so as to transform the rotational movement of said pinion 21 around the axis X of said shaped central hole 21c into the translational movement of said slide 15' in the direction Y.

According to this third embodiment, the supporting device 10" for furniture shelves advantageously comprises elastic means 19, advantageously composed of a helical spring 19 which can be associated with said slide 15' for example inserted in a tubular receiving seat 18'.

In order to allow the shelf 100 to be assembled inside a piece of furniture having opposite sides 200 similarly to what has been previously described with reference to FIG. 33, the supporting device 10" according to this third preferred embodiment of the invention advantageously comprises retention means suitable for keeping said slide in a withdrawn position corresponding to the first non-operating position.

Said retention means advantageously comprise a pair of retaining grooves 25 on said slide 15', configured for receiving corresponding elastically deformable engagement teeth 14c formed inside the main body 12 so as to allow the snap-engagement of said engagement teeth 14c within said retaining grooves 25.

Figure 32:
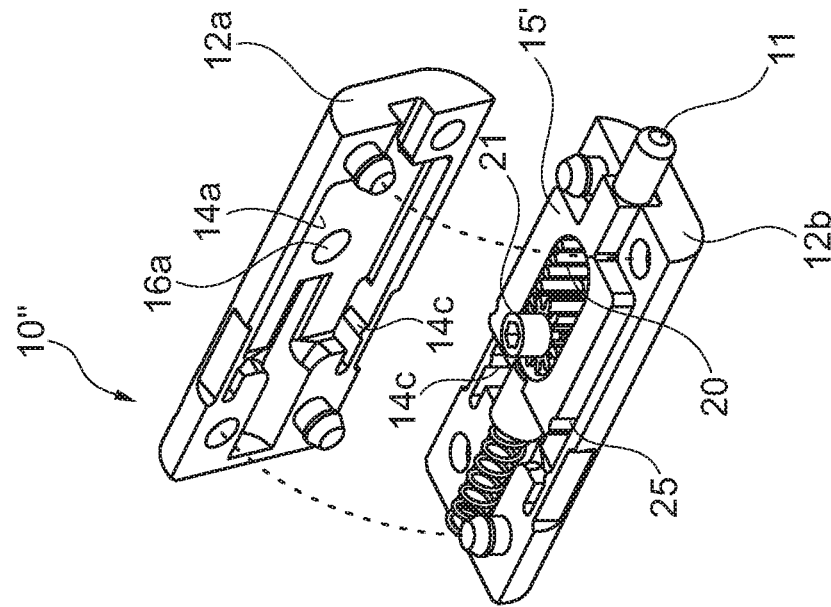
Figure 32A:
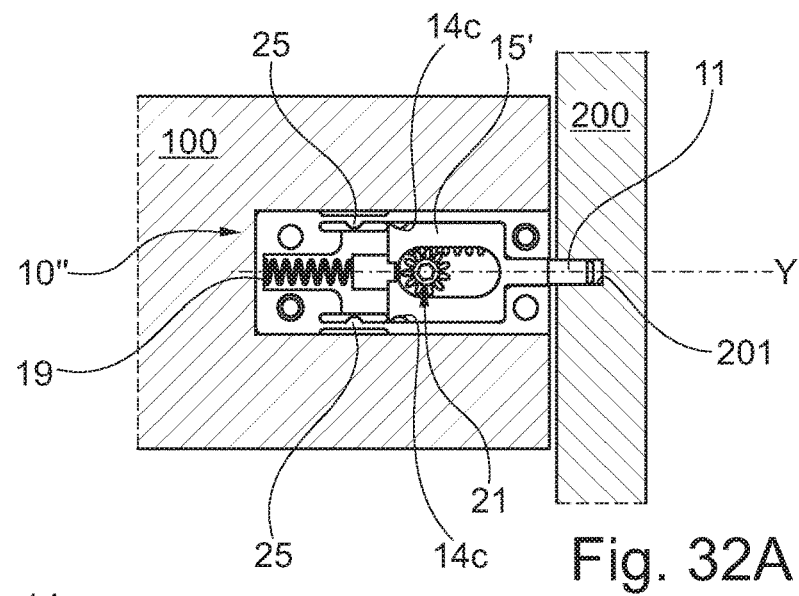
Figure 32B:
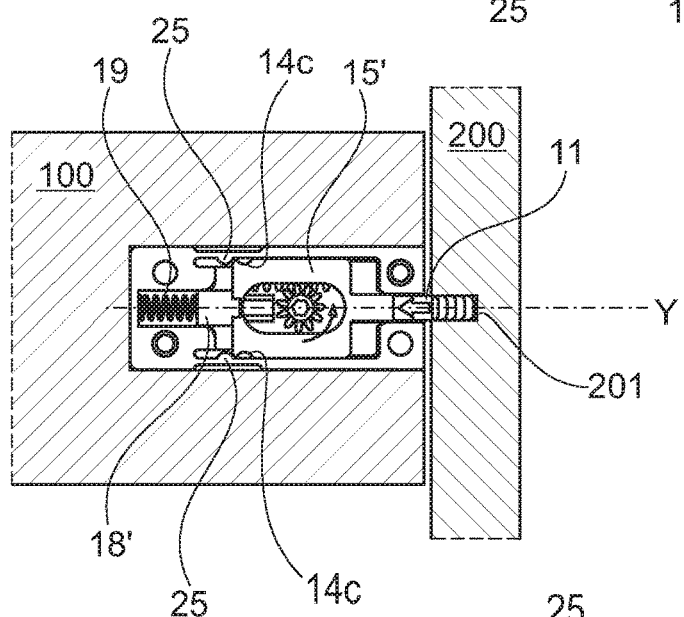
Figure 32C:
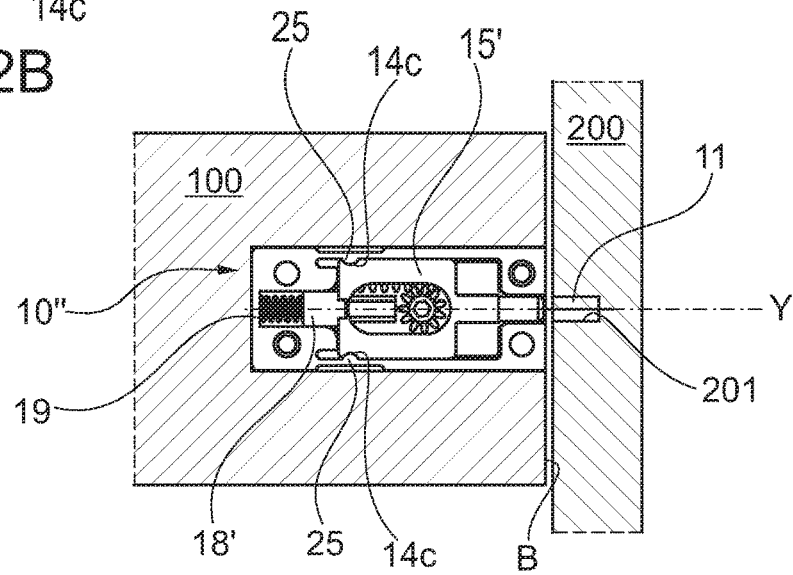

With particular reference to FIGS. 32A, 32B and 32C, the functioning of the device 10" is as follows: when the slide 15' moves backwards due to the action of the operator on the pinion 21 or due to an external thrust on the pin 11 for example by the operator, the elastic means 19 comprising the helical spring are loaded until the retention means 14c, 25 start functioning. In particular, when the slide 15' moves as much as to be brought in correspondence with the engagement teeth 14c formed on the internal wall of the box-shaped body 12 so as to be elastically deformable, they widen outwardly under the thrust of the slide 15' itself and move closer together elastically towards the inside of the device when they find the corresponding retaining grooves 25 within which they can be inserted.

At this point the slide is blocked in the withdrawn position as the action of the retention means 14c, 25 counteracts the thrust of the helical spring 19. It is sufficient for the operator to block the retention means with a minimum rotation of the pinion 21 to allow the spring 19 to rapidly bring the pin 11 into the operating condition.

Also in this case, a third intermediate condition of the slide 15' and pin 11 is advantageously provided withdrawn but not blocked, as previously described in relation to the second preferred embodiment.

Also in this variant of the supporting device 10" according to the present invention, the main body 12 is advantageously composed of two half-shells 12a, 12b each of which comprises a respective receiving seat portion 14a, 14b of said slide 15'.

Furthermore, on each of said half-shells 12a, 12b a receiving hole 16a, 16b is advantageously also provided for receiving the central body 21a of said pinion 21, said receiving holes 16a, 16b being reciprocally aligned, and aligned on the axis X when the device is assembled, and providing access for a tool to said shaped central hole 21c of said pinion 21, so that the latter can be rotated by the operator by acting with the tool both from above and below with respect to the device itself, similarly to what has been illustrated previously with reference to the other embodiments.

For this purpose, said shaped central hole 21c of said pinion 21 is advantageously a pass-through hole, so that said pinion 21 can be actuated in rotation by means of a tool with access to the main body 12 of the device 10" from both above and below.

With particular reference to FIGS. 43 to 51, further embodiments of the shelf-bracket device according to the present invention can advantageously provide that said movable engagement means 15''' comprise actuation means in turn comprising a tilted plane 31.

Said movable engagement means 15''', advantageously composed of a slide, are sliding with respect to the main body 12 of said shelf-bracket device 10''' along a sliding direction Y between a first non-operating position in which the pin 11 does not protrude from the side B of the shelf 100 with the device assembled (FIG. 45), and a second operating position in which the pin 11 protrudes outwardly from said shelf 100 (FIG. 43).

Said tilted plane 31 is preferably inclined with respect to the horizontal direction so that the interaction with actuation means 32 movable in the direction X substantially orthogonal with respect to the sliding direction Y causes the withdrawal of said movable engagement means 15''', and therefore of said pin 11.

In the embodiment shown by way of example in FIGS. 43 to 45, the shelf-bracket device 10''' according to the present invention advantageously comprises actuation means 32 movable in the direction X substantially orthogonal with respect to the sliding direction, which comprise a threaded grub screw 32 that can be screwed into a threaded seat 33 by means of a tool U.

As can be seen with reference to FIGS. 43, 44 and 45, the translation in the direction X, upwards, according to the figures, of the grub screw 32 obtained by screwing the same grub screw 32 into the threaded seat 33 suitably provided inside the box-shaped body 12 of the device, causes the slide 15''' to slide towards the rear area of the device, i.e. a withdrawal of the slide which involves the withdrawal of the pin 11, which entails the passage from the operating position in which said pin 11 protrudes from the edge B outwardly from the shelf 100 (FIG. 43), to the non-operating position wherein said pin 11 does not protrude from the edge B of the shelf 100 (FIG. 45) with the device 10''' device assembled on a shelf 100.

When the operator acts with the tool U by unscrewing the grub screw 32 and then causing it to move downwards along the direction X, the slide 15''' is pushed forwards by the action of the spring 19 and causes the advancement of the pin 11 (FIG. 43). Similarly, when the operator screws the grub screw 32 causing it to move upwards along the direction X, it causes the slide 15''' to withdraw and the spring 19 to be compressed.

According to what has been illustrated so far, therefore, the grub screw 32 also exerts the function of retaining the slide 15''' in the withdrawn position even when the tool U is removed. In this sense, the grub screw 32 exerts the function of the retention means of the movable engagement means 15'''.

The tool U can advantageously consist of an Allen key or the like, and a hole F is conveniently provided on said shelf 100 for the actuation of the grub screw 32 by means of the tool U.

With reference to FIGS. 46 to 48, according to a further variant of the device 10'''' according to the present invention, the actuation means 32 movable in the direction X substantially orthogonal with respect to the sliding direction Y comprise a plug 32 or a nail suitable for exerting a thrust directly on the tilted plane 31 of said slide 15''' so that, similarly to what has been seen with reference to the embodiment of FIGS. 43 to 45, the upward thrust along the direction X substantially orthogonal to the sliding direction Y of the slide 15''' causes the slide to move backwards, which entails the withdrawal of the pin 11 and, consequently, the passage from the operating position in which said pin 11 protrudes from the edge B outwardly from the shelf 100 (FIG. 46), to the non-operating position in which said pin 11 does not protrude from the edge B of the shelf 100 (FIG. 48) when the device 10''' is assembled on a shelf 100.

Also in this case, a helical spring 19 is advantageously provided to return the slide 15''' to the advanced position when the pin 32 is removed.

In order to allow the insertion of the plug or nail 32, the main body 12 of the device has at least one hole 12'.

According to what can be seen in FIGS. 46, 48, the main body 12 of the device advantageously comprises at least two holes 12' aligned with each other along an axis which, when the device is assembled on the shelf 100, coincide with the axis of the hole F formed on the shelf.

Whereas the first of said holes 12' allows the insertion of the pin 32 in the device in order to allow the thrust of the slide 15''', the second of said holes 12' allows the pin 32 itself to be blocked in the direction Y, so that it can effectively keep the slide in the withdrawn position by counteracting the action of the spring 19. Consequently, in this embodiment the pin 32 also exerts the function of the retention means already seen for the other embodiments discussed.

This embodiment does not provide for actuation of the device through a rotation manoeuvre but through a simple push, which can offer a considerable advantage for the operator who often has to work in confined spaces during the assembly of the shelf to the furniture.

With reference to FIGS. 49 to 51, a variant of the device is then illustrated comprising thrust actuation means described above with reference to FIGS. 46 to 48.

This variant provides that the device 10'''' further comprises retention means 34 of the slide 15''' suitable for keeping the slide in the withdrawn position, counteracting the thrust exerted by the helical spring 19.

Said retention means 34 advantageously comprise a rod 35 provided at one end with a retaining tooth 36 and pivoted on a hinge 37 so as to be able to oscillate around said hinge 37.

A receiving seat 38 is advantageously provided on said slide 15''' for said retaining tooth 36, and a helical spring 40 or similar suitable means is suitably provided beneath the end of said rod which comprises said retaining tooth 36, for exerting a thrust on the end of said rod 35 in order to keep said retaining tooth 36 within said receiving seat 38.

The main body 12 is also provided in this embodiment with a further hole 39 positioned at the end of said rod 35 opposite the end equipped with said retaining tooth 36 with respect to said hinge 37.

Thanks to this configuration, the operator inserts the plug or the nail 32 into the device causing the withdrawal of the slide 15''' and when the withdrawal is complete, the receiving seat 38 is positioned in correspondence with the retaining tooth 36 which, pushed by the spring 40, is inserted into said receiving seat 38.

At this point, the device is blocked with the slide 15''' in the withdrawn position, and consequently with the pin 11 retracted, so that the shelf can be assembled to the furniture even under conditions of limited space.

In order to unblock the device, the operator can insert an unblocking tool 50 into the hole 39 provided in the box-shaped body 12, preferably rod-like, suitable for moving the rod 35 in rotation, counteracting the action of the spring 40 and causing the retaining tooth 36 to come out of the receiving seat 38. The presence of the retention means 34 makes it possible to keep the device blocked even when the pin 32 is removed, which certainly allows the operator to move the shelf more easily, as the pin 11 is withdrawn.

All the embodiments of the shelf-bracket device according to the present invention described so far, and other possible variants, in any case falling within the protection scope defined by the enclosed claims, allow a hole F having very small dimensions to be formed in the shelf for moving the movable engagement means.

FIG. 52 schematically illustrates by way of example how the supporting device for shelves according to the present invention has been conceived and sized for being actuated through a maneuvering tool which requires the formation of a hole F in the shelf, having a diameter smaller than 3 mm.

To date in fact, holes that are produced in panels generally have diameters larger than 3 mm, and this means that, on observing the hole from below, the user can see, inside the shelf, the chipboard of which the shelf itself is made.

Given the request by designers and manufacturers to prevent the chipboard from being visible during normal use, a cap must be used for closing the hole.

The shelf-bracket device according to the present invention allows the device itself to be actuated through an unusually small access hole F, i.e. having a diameter of less than 3 mm which, according to what is schematically illustrated in FIG. 52, is invisible to the user who is operating near the shelf itself.

This technical advantage has been achieved by configuring the shelf-bracket device in such a way that a particular effort is not required for actuating it, allowing the use of U-shaped maneuvering tools having reduced dimensions (in particular diameters), with the possibility of using a micro-wrench, for example.

Taking as reference the conventional measurements of the base elements and wall units of a kitchen reported in the standards, FIG. 52 shows with reference to exemplary, non-limiting measurements, the view of the eye of a user of average height, that could normally have an angle of between 10 and 30 degrees.

Under these conditions, in fact, with a hole F in the shelf having a diameter of less than 3 mm, the operator can in no way see the inside of the hole, and, in particular, can therefore in no way see the chipboard material inside the hole F produced in the shelf even when the user is actually looking at the shelf from below.

A further advantage of the supporting device for furniture shelves according to the present invention therefore consists in allowing the production of maneuvering holes F in the shelf having a diameter of less than 3 mm, i.e. micro-holes, which are therefore practically invisible to the user's eye and which do not require the use of closing caps, undoubtedly unsightly.

The present invention has been described, for illustrative but non-limiting purposes, with reference to various preferred embodiments. It should be understood, however, that variations and/or modifications can be applied by a skilled person in the field without thereby departing from the relative protection scope as defined in the enclosed claims.

The invention claimed is:

1. A supporting device for furniture shelves for a reversible connection of a shelf to a shoulder of a piece of furniture, wherein the reversible connection is obtained with a pin associated with said shelf and configured so as to protrude from an edge of said shelf and be inserted into a corresponding receiving hole formed on said shoulder of said piece of furniture, the supporting device comprising:
a slide, said pin being integrally associated with said slide;
a main body,
wherein said device is configured to be inserted within a thickness of said shelf, and
wherein said slide is disposed to slide with respect to said main body along a sliding direction between a first non-operating position, in which said pin does not protrude from said shelf, and a second operating position in which said pin protrudes from said shelf outwardly;
actuation means of said slide; and
movement-transmission means configured to transform a movement of said actuation means into a translational movement along the sliding direction of said slide,
wherein said actuation means comprise a cam positioned in an outlet defined in the slide, and
wherein said cam comprises a hollow central body having a central axial hole therein that is shaped for receiving a maneuvering tool, and further comprises a cam profile configured for interacting with a shaped internal profile of said slide so as to transform a rotational motion of said cam around an axis of said central hole into a translational movement of said slide in said sliding direction;
further comprising retention means configured as a receiving groove defined on a rear internal wall of said shaped internal profile of said slide, said receiving groove being configured for receiving an end of said cam profile when said cam is completely rotated so as to be arranged along said sliding direction, whereby, when an end of said cam profile is in said receiving groove, said supporting device remains blocked in a withdrawn pin position corresponding to said first non-operating position.

2. The supporting device for furniture shelves according to claim 1, wherein said actuation means are rotatable around an axis substantially orthogonal with respect to the sliding direction of said slide.

3. The supporting device for furniture shelves according to claim 1, wherein said slide is further movable in at least a third intermediate non-operating and non-blocked position, in which said pin is free to withdraw until said pin is completely retracted, and wherein said retention means do not keep said slide blocked.

4. The supporting device for furniture shelves according to claim 1, wherein said main body comprises a seat for receiving said slide, said slide being slidingly housed within said seat.

5. The supporting device for furniture shelves according to claim 4, wherein said main body is composed of two half-shells, each of said half-shells housing a respective portion of the seat of said slide, a receiving hole being further provided on each of said half-shells for receiving the central body of said cam, said receiving holes being reciprocally aligned along the axis passing through the central axial hole when the supporting device is assembled and providing access for a tool to said central axial hole of said cam.

6. The supporting device for furniture shelves according to claim 1, wherein said central axial hole of said cam is a pass-through hole, so that said cam can be actuated in rotation with a tool, accessing both a top and a bottom of the main body of the supporting device.

7. The supporting device for furniture shelves according to claim 1, wherein said sliding direction coincides with a symmetry axis of said pin and of said main body.

8. The supporting device for furniture shelves according to claim 1, wherein said central body of said cam is positioned with a cylindrical symmetry axis of said central body, coincident with the axis passing through said central axial hole of said central body, arranged orthogonally with respect to the sliding direction of said slide, said central body of said cam being positioned along a symmetry axis of the main body, which defines the sliding direction of said slide.

9. The supporting device for furniture shelves according to claim 1, wherein said cam is rotatable around the axis passing through the central hole of the central body between a first non-operating position, in which said cam is arranged with its cam profile along a symmetry axis defining the sliding direction of said slide and is completely contained within said outlet formed inside said slide abutting against an internal wall of said outlet so as to keep said slide in a withdrawn position, so that said pin does not protrude from said shelf, and a second operating position in which said cam is arranged with its cam profile arranged substantially orthogonal to said symmetry axis and is abutted against an end of its cam profile within an abutment seat formed on said main body so as to keep said slide in an advanced position so that said pin protrudes from said shelf.

10. The supporting device for furniture shelves according to claim 9, further comprising elastic means interposed between an internal abutment surface of said main body and said slide and adapted to oppose a retraction movement of the slide, which causes a passage from an operating position, in which said slide is in an advanced position and said pin extends outwardly from the shelf, to a non-operating position, in which said slide is in a withdrawn position and said pin does not protrude from said shelf when the device is assembled on the shelf.

11. The supporting device for furniture shelves according to claim 10, wherein said slide further comprises, at an edge of said slide opposite the edge of the shelf from which said pin extends, a second pin having a longitudinal development and developing along said symmetry axis on which said elastic means are positioned.

12. The supporting device for furniture shelves according to the claim 11, wherein said elastic means consist of a helical spring.

13. The supporting device for furniture shelves according to claim 1, wherein said main body of said supporting device is configured to be assembled inside said shelf flush with the edge of said shelf, from which said pin protrudes, and is further designed to face the shoulder for connecting the shelf to the shoulder, and wherein said slide of said supporting device is configured so that when said slide is in said first non-operating position, in which said slide is in a withdrawn position, said pin does not protrude from an edge of the main body, which is flush with the edge of said shelf designed for facing the shoulder of the piece of furniture.

14. The supporting device for furniture shelves according to claim 1, wherein the supporting device is configured to require, when assembled in a shelf, a hole to be made for access of a maneuvering tool having a diameter less than 3 mm.

\* \* \* \* \*